US012739962B2

(12) United States Patent
Hosokai et al.

(10) Patent No.: US 12,739,962 B2
(45) Date of Patent: Sep. 15, 2026

(54) ELECTRON BEAM GENERATION APPARATUS AND ELECTRON BEAM GENERATION METHOD

(71) Applicant: OSAKA UNIVERSITY, Suita (JP)

(72) Inventors: Tomonao Hosokai, Osaka (JP); Yanjun Gu, Osaka (JP); Zhan Jin, Osaka (JP)

( * ) Notice: Subject to any disclaimer, the term of this patent is extended or adjusted under 35 U.S.C. 154(b) by 0 days.

(21) Appl. No.: 19/115,802

(22) PCT Filed: Nov. 14, 2023

(86) PCT No.: PCT/JP2023/040991
§ 371 (c)(1),
(2) Date: Mar. 27, 2025

(87) PCT Pub. No.: WO2024/116836
PCT Pub. Date: Jun. 6, 2024

(65) Prior Publication Data

US 2026/0107370 A1 Apr. 16, 2026

(30) Foreign Application Priority Data

Dec. 2, 2022 (JP) ................................ 2022-193304
Jul. 6, 2023 (JP) ................................ 2023-111362

(51) Int. Cl.
*H05H 1/46* (2006.01)

(52) U.S. Cl.
CPC .................................... *H05H 1/46* (2013.01)

(58) Field of Classification Search
None
See application file for complete search history.

(56) References Cited

U.S. PATENT DOCUMENTS 3,462,636 A * 8/1969 Horst ...................... H01J 25/49 315/5
4,439,686 A * 3/1984 Cheever .................... A61L 2/08 174/18

(Continued)

FOREIGN PATENT DOCUMENTS

CN 106536093 A * 3/2017 .............. B22F 12/70
DE 112015003334 T5 * 3/2017 .............. B22F 10/28

(Continued)

OTHER PUBLICATIONS

A. Buck et al., "Shock-Front Injector for High-Quality Laser-Plasma Acceleration", Physical Review Letters, American Physical Society, PRL 110, 185006 (2013) , May 3, 2013.

(Continued)

*Primary Examiner* — Srinivas Sathiraju
(74) *Attorney, Agent, or Firm* — SHIPWAY IP

(57) ABSTRACT

An electron beam generation apparatus includes a supersonic nozzle configured to generate the supersonic gas flow flowing along a first direction under a vacuum atmosphere; a knife edge configured to be inserted into the supersonic gas flow from one side in a second direction intersecting the first direction and form a shock wave in the supersonic gas flow; and a radiation unit configured to radiate the pulsed laser light into the supersonic gas flow and propagate the pulsed laser light to pass through the shock wave in the supersonic gas flow. The supersonic nozzle includes a convergence portion having a downstream end forming a throat and an upstream end having a flow channel cross-sectional area larger than a cross-sectional area of the throat, and a flow straightening chamber configured to be smoothly connected to the upstream end of the convergence portion and extend by a predetermined length.

12 Claims, 29 Drawing Sheets

(56) References Cited

U.S. PATENT DOCUMENTS

| | | | | | |
|---|---|---|---|---|---|
| 5,319,322 | A * | 6/1994 | O'Loughlin | H03B 9/02 331/81 |
| 7,190,764 | B2 * | 3/2007 | Mori | H05H 13/08 315/111.81 |
| 7,308,078 | B2 * | 12/2007 | Wilkins | G21K 7/00 378/126 |
| 10,104,753 | B2 * | 10/2018 | Hosokai | H05G 2/0082 |
| 11,834,204 | B1 * | 12/2023 | Gorokhovsky | B64G 1/413 |
| 2003/0108155 | A1 * | 6/2003 | Wilkins | H05H 6/00 378/119 |
| 2004/0000647 | A1 * | 1/2004 | Horsky | H01J 27/20 250/427 |
| 2004/0011917 | A1 * | 1/2004 | Saeks | B64C 21/04 244/1 N |
| 2004/0195972 | A1 * | 10/2004 | Cornelius | H01J 27/18 315/111.21 |
| 2006/0056596 | A1 * | 3/2006 | Mori | H05H 13/08 378/138 |
| 2008/0219297 | A1 * | 9/2008 | Yamada | H01S 4/00 372/5 |
| 2018/0168024 | A1 * | 6/2018 | Mao | A61N 5/1001 |
| 2018/0184510 | A1 * | 6/2018 | Hosokai | H05G 2/0082 |
| 2021/0085999 | A1 * | 3/2021 | Bartkoski | A61N 5/1038 |
| 2022/0084805 | A1 * | 3/2022 | Javahery | H01J 49/0468 |
| 2026/0107370 | A1 * | 4/2026 | Hosokai | H05H 1/46 |

FOREIGN PATENT DOCUMENTS

| | | | | | |
|---|---|---|---|---|---|
| DE | 112015003337 | T5 * | 5/2017 | B22F 10/322 |
| EP | 2051140 | A1 * | 4/2009 | H05G 2/0088 |
| RU | 2277137 | C1 * | 5/2006 | |
| WO | WO-9622841 | A1 * | 8/1996 | H01J 27/14 |
| WO | WO-2011114958 | A1 * | 9/2011 | G03F 7/70916 |

OTHER PUBLICATIONS

International Search Report dated Dec. 19, 2023 for PCT/JP2023/040991.

International Preliminary Report on Patentability with Written Opinion dated Jun. 12, 2025 for PCT/JP2023/040991.

* cited by examiner (a)

(b)

(a)

(b)

(a)

(b)

(a)

(b)

(a)

(b)

(a)

(b)

ELECTRON BEAM GENERATION APPARATUS AND ELECTRON BEAM GENERATION METHOD

CROSS-REFERENCE TO RELATED APPLICATIONS

This application is a 35 U.S.C. § 371 national phase application of PCT Application No. PCT/JP2023/040991, filed on Nov. 14, 2023, which claims the benefit of priority from Japanese Patent Application No. 2023-111362, filed on Jul. 6, 2023, and Japanese Patent Application No. 2022-193304, filed on Dec. 2, 2022.

TECHNICAL FIELD

One aspect of the present invention relates to an electron beam generation apparatus and an electron beam generation method.

BACKGROUND ART

As electron beam generation apparatuses, there are known apparatuses that generate an electron beam by propagating pulsed laser light in a supersonic gas flow. For example, in an electron beam generation apparatus described in Non Patent Literature 1 below, a supersonic gas flow is generated under a vacuum atmosphere by a supersonic nozzle, and a shock wave is formed by inserting a knife edge (razor blade) into the generated supersonic gas flow. Then, an electron beam is generated by radiating and propagating pulsed laser light to pass through a shock wave in the supersonic gas flow.

CITATION LIST

Non Patent Literature

Non Patent Literature 1: A. Buck et al. "Shock-Front Injector for High-Quality Laser-Plasma Acceleration," PHYSICAL REVIEW LETTERS, American Physical Society, PRL 110, 185006 (2013), 3 May 2013

SUMMARY OF INVENTION

Technical Problem

The above-described electron beam generation apparatus has a concern that stability of the electron beam is low, and for example, a probability of generation of the electron beam is low.

In this regard, an object of one aspect of the present invention is to provide an electron beam generation apparatus and an electron beam generation method capable of enhancing stability of an electron beam.

Solution to Problem (1) An electron beam generation device according to one aspect of the present invention is an electron beam generation apparatus configured to generate an electron beam by propagating pulsed laser light in a supersonic gas flow, the electron beam generation apparatus including a supersonic nozzle configured to generate the supersonic gas flow flowing along a first direction under a vacuum atmosphere, a knife edge configured to be inserted into the supersonic gas flow from one side in a second direction intersecting the first direction and form a shock wave in the supersonic gas flow, and a radiation unit configured to radiate the pulsed laser light into the supersonic gas flow and propagate the pulsed laser light to pass through the shock wave in the supersonic gas flow, in which the supersonic nozzle includes a convergence portion having a downstream end forming a throat and an upstream end having a flow channel cross-sectional area larger than a cross-sectional area of the throat, and a flow straightening chamber configured to be smoothly connected to the upstream end of the convergence portion and extend by a predetermined length.

In the electron beam generation apparatus according to the one aspect of the present invention, the supersonic gas flow is formed under the vacuum atmosphere by the supersonic nozzle, the knife edge is inserted into the formed supersonic gas flow, and the shock wave is formed in the supersonic gas flow. When the pulsed laser light is radiated and propagated in the supersonic gas flow, the pulsed laser light passes through the shock wave, thereby causing the electron beam having directionality to the other side in the second direction to be generated. Here, as a result of close studies, the present inventors have found that the stability of the electron beam is affected by the stability of a gas density distribution of the supersonic gas flow (hereinafter, also simply referred to as a "gas density distribution"). In this respect, in the one aspect of the present invention, since the supersonic nozzle has the flow straightening chamber, for example, generation of a turbulent flow (uncertainty in turbulent motion) in the supersonic gas flow generated by the supersonic nozzle can be curbed, and the stability of the gas density distribution can be enhanced. This enables the stability of the electron beam to be enhanced.

(2) In the electron beam generation apparatus according to (1), the convergence portion and the flow straightening chamber may extend along the first direction, and the predetermined length may be 20 mm or longer. In this case, the flow straightening chamber of the supersonic nozzle enables, for example, the generation of a turbulent flow in the supersonic gas flow generated by the supersonic nozzle to be reliably curbed and enables the stability of the gas density distribution to be reliably enhanced.

(3) In the electron beam generation apparatus of the present invention according to (1) or (2), the supersonic nozzle may include a flow straightening member configured to be provided inside the flow straightening chamber and have a plurality of fine holes formed in a flowing direction of the flow straightening chamber. In this case, a flow rectification of the flow straightening member enables, for example, the generation of a turbulent flow in the supersonic gas flow generated by the supersonic nozzle to be further curbed and enables the stability of the gas density distribution to be further enhanced.

(4) In the electron beam generation apparatus according to (3), the convergence portion and the flow straightening chamber may extend along the first direction, and the predetermined length may be 10 mm or longer. In this case, the flow straightening chamber of the supersonic nozzle enables, for example, the generation of a turbulent flow in the supersonic gas flow generated by the supersonic nozzle to be reliably curbed and enables the stability of the gas density distribution to be reliably enhanced.

(5) In the electron beam generation apparatus according to (3) or (4), the flow straightening member may be disposed inside the flow straightening chamber at a distance of 5 mm or longer from an upstream end or a downstream end of the flow straightening chamber. In this case, the flow rectification of the flow straightening member can be reliably exhibited.

(6) In the electron beam generation apparatus according to any one of (1) to (5), at least a tip portion of the knife edge may be inclined toward the supersonic nozzle with respect to a direction perpendicular to the first direction. At least the tip portion of the knife edge is inclined toward the supersonic nozzle with respect to the direction perpendicular to the first direction, thereby enabling the shock wave linearly extending from the tip of the knife edge to be formed in the supersonic gas flow. In this case, a generation position of the electron beam in the supersonic gas flow can be stabilized, and the stability of the electron beam can be enhanced.

(7) In the electron beam generation apparatus according to any one of (1) to (6), the supersonic nozzle may be configured to be dividable such that the flow straightening chamber is divided. In this case, the flow straightening chamber can be easily formed.

(8) In the electron beam generation apparatus according to any one of (1) to (7), the knife edge may be configured to be able to adjust a length by which the knife edge is inserted into the supersonic gas flow. A change in the length by which the knife edge is inserted into the supersonic gas flow enables a magnitude and a position of a peak in the gas density distribution to be changed. For example, this enables a length of an acceleration region (a region where the gas density distribution is maintained within the certain range) on the other side in the second direction with respect to the peak in the gas density distribution to be adjusted as desired. Since the generated electron beam can be accelerated in the acceleration region, acceleration energy of the electron beam can be adjusted as desired.

(9) In the electron beam generation apparatus according to any one of (1) to (8), the knife edge may be configured to be able to adjust an insertion angle being an angle between an extending direction of the knife edge and the second direction in a state where the knife edge is inserted into the supersonic gas flow. A change in the insertion angle of the knife edge enables the inclination of the shock wave formed in the supersonic gas flow to be changed. This enables parameters (a charge amount, a probability of generation, and the like) of the electron beam which is to be generated to be adjusted as desired.

(10) In the electron beam generation apparatus according to any one of (1) to (9), the knife edge may cause a gas density distribution of the supersonic gas flow in the second direction to become a distribution that rises steeply, falls steeply, and then is maintained within a certain range from one side toward the other side in the second direction. In this case, the insertion of the knife edge into the supersonic gas flow from the one side in the second direction enables a gas density distribution suitable for generating the electron beam to be formed.

(11) In the electron beam generation apparatus according to (10), the pulsed laser light radiated from the radiation unit may cause plasma wave crushing to occur, and the electron beam may be generated by the plasma wave crushing in a region where the gas density distribution of the supersonic gas flow in the second direction falls steeply, and the generated electron beam may be accelerated in an acceleration region where the gas density distribution of the supersonic gas flow in the second direction is maintained within the certain range. As described above, in the electron beam generation apparatus, the electron beam can be generated using the plasma wave crushing. In this case, the generated electron beam can be accelerated using a region where the gas density distribution is maintained within the certain range.

(12) An electron beam generation method according to one aspect of the present invention is an electron beam generation method for generating an electron beam by propagating pulsed laser light in a supersonic gas flow, the electron beam generation method including a first step of generating the supersonic gas flow flowing along a first direction under a vacuum atmosphere by a supersonic nozzle, a second step of inserting a knife edge into the supersonic gas flow from one side in a second direction intersecting the first direction and forming a shock wave in the supersonic gas flow, and a third step of radiating the pulsed laser light into the supersonic gas flow by a radiation unit, propagating the pulsed laser light to pass through the shock wave in the supersonic gas flow, and generating the electron beam, in which the supersonic nozzle includes a convergence portion having a downstream end forming a throat and an upstream end having a flow channel cross-sectional area larger than a cross-sectional area of the throat, and a flow straightening chamber configured to be smoothly connected to the upstream end of the convergence portion and extend by a predetermined length. In the first step, a gas is caused to flow by a predetermined length in the flow straightening chamber, and then the gas converges while being caused to flow in the convergence portion.

In the electron beam generation method according to the one aspect of the present invention, in the first step of generating the supersonic gas flow flowing along the first direction under the vacuum atmosphere by the supersonic nozzle, the gas is caused to flow by the predetermined length in the flow straightening chamber, and then the gas converges while being caused to flow in the convergence portion. This causes, for example, the generation of a turbulent flow (uncertainty in turbulent motion) in the generated supersonic gas flow to be curbed, enables the stability of the gas density distribution to be enhanced, and enables the stability of the electron beam to be enhanced.

Advantageous Effects of Invention

According to one aspect of the present invention, it is possible to provide an electron beam generation apparatus and an electron beam generation method capable of enhancing stability of an electron beam.

4(*b*) is a diagram illustrating an eddy viscosity of the gas inside the supersonic nozzle in the case where the flow straightening chamber has a predetermined length of 10 mm.

Figure 5:
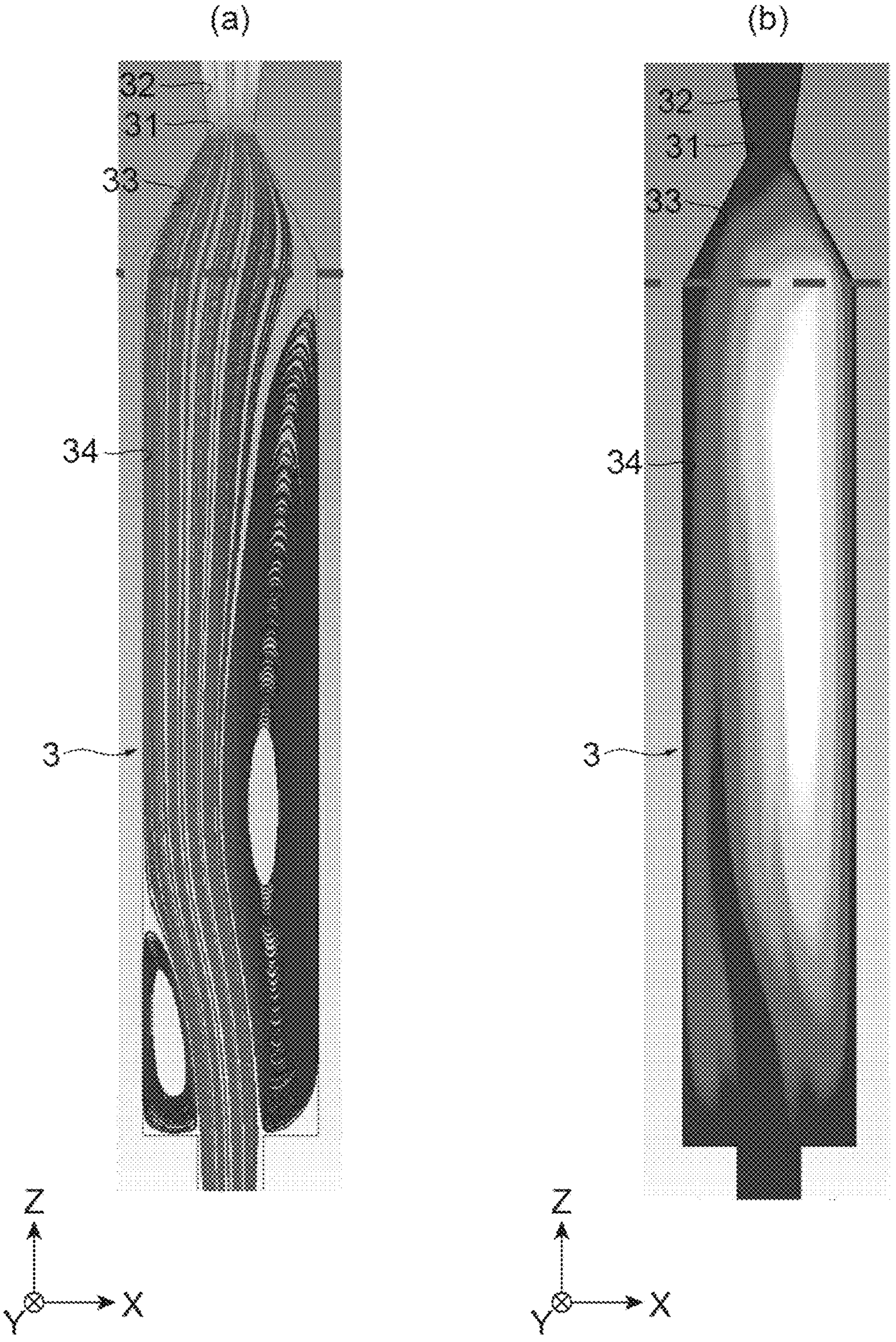

FIG. 5(*a*) is a diagram illustrating gas velocity streamlines inside the supersonic nozzle in a case where the flow straightening chamber has a predetermined length of 20 mm. FIG. 5(*b*) is a diagram illustrating an eddy viscosity of the gas inside the supersonic nozzle in the case where the flow straightening chamber has a predetermined length of 20 mm.

Figure 6:
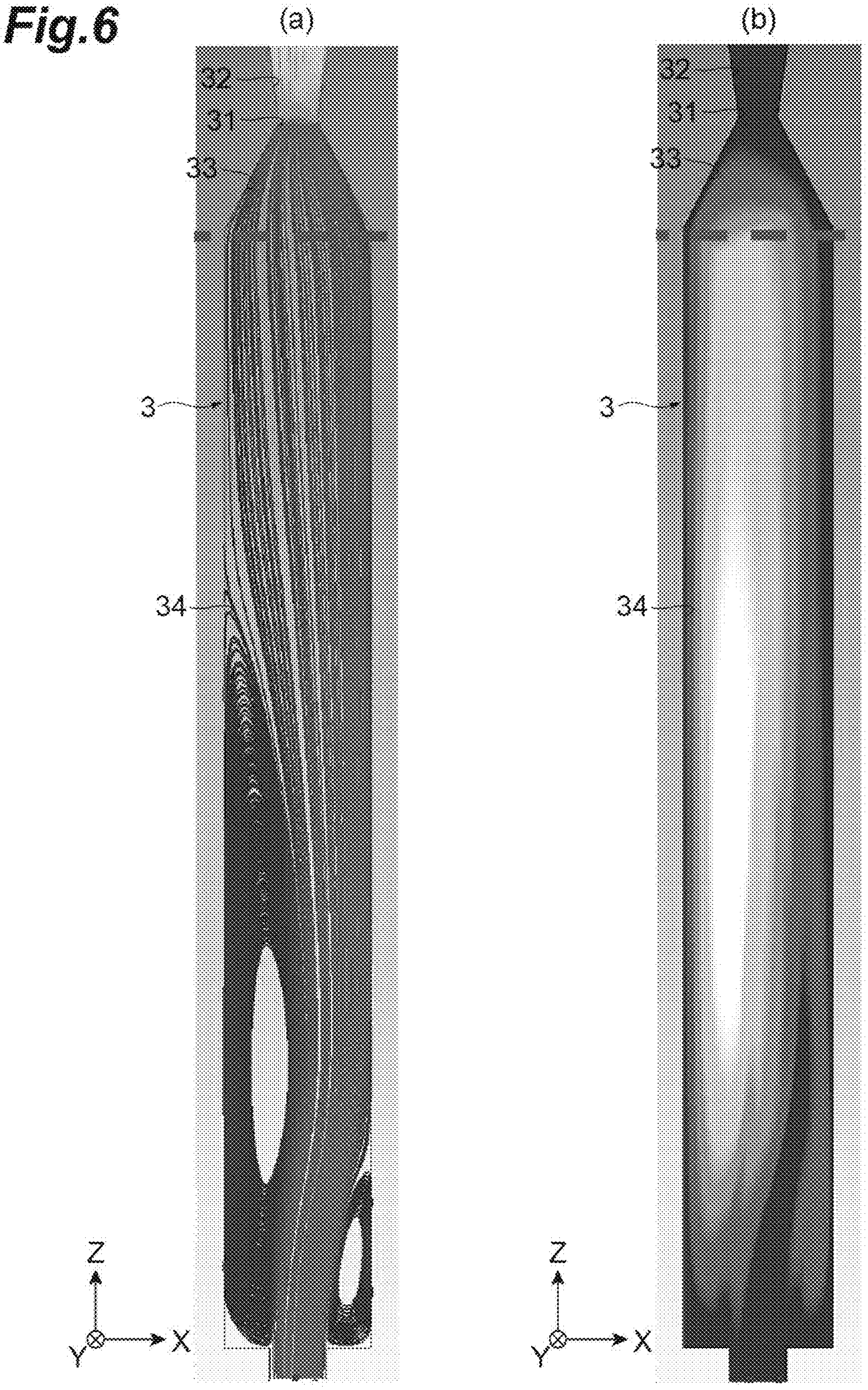

FIG. 6(*a*) is a diagram illustrating gas velocity streamlines inside the supersonic nozzle in a case where the flow straightening chamber has a predetermined length of 30 mm. FIG. 6(*b*) is a diagram illustrating an eddy viscosity of the gas inside the supersonic nozzle in the case where the flow straightening chamber has a predetermined length of 30 mm.

Figure 7:
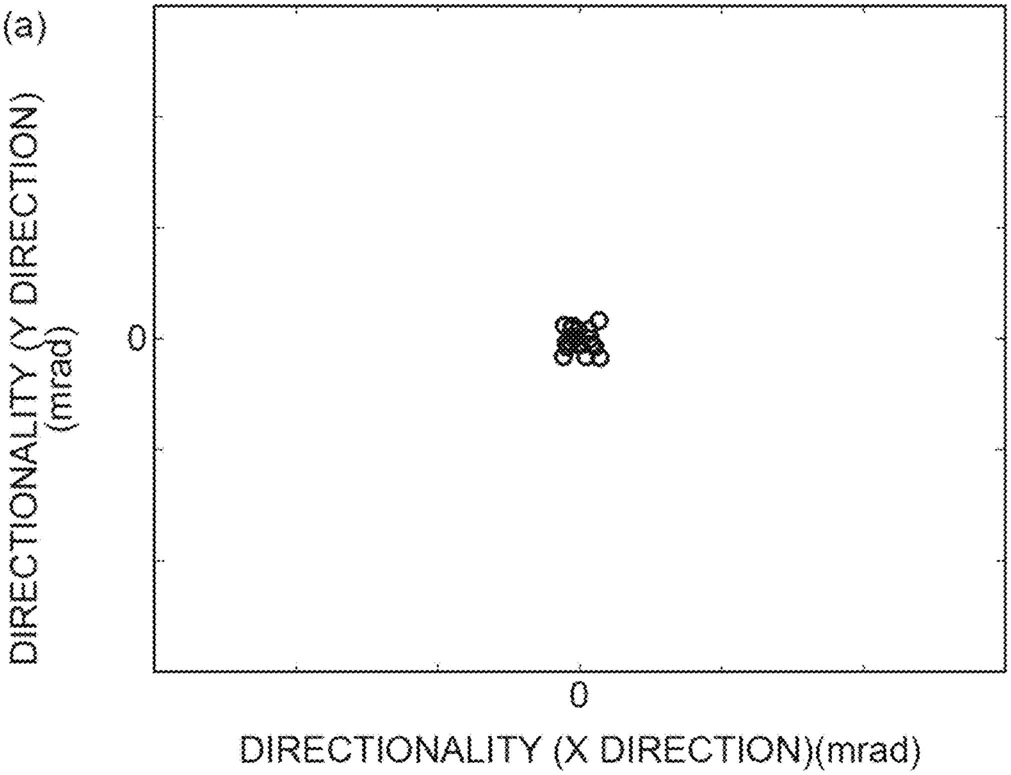
Figure 7:
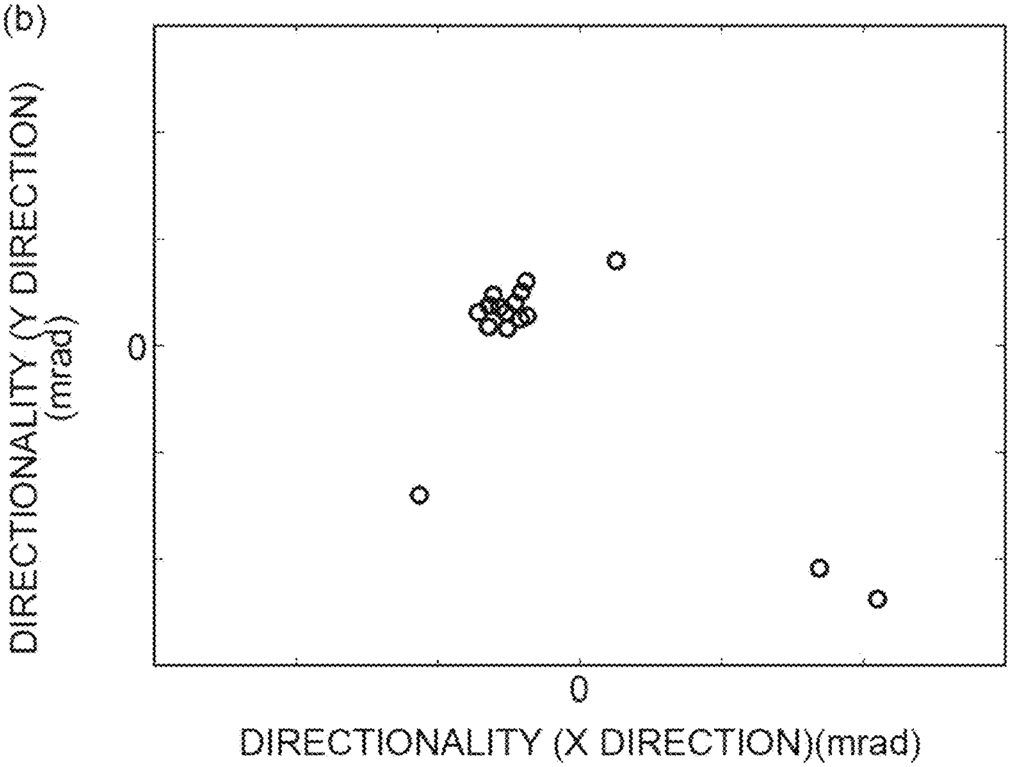

FIG. 7(*a*) is a graph illustrating a directional distribution of electron beams in a first example. FIG. 7(*b*) is a graph illustrating a directional distribution of electron beams in a first comparative example.

Figure 8:
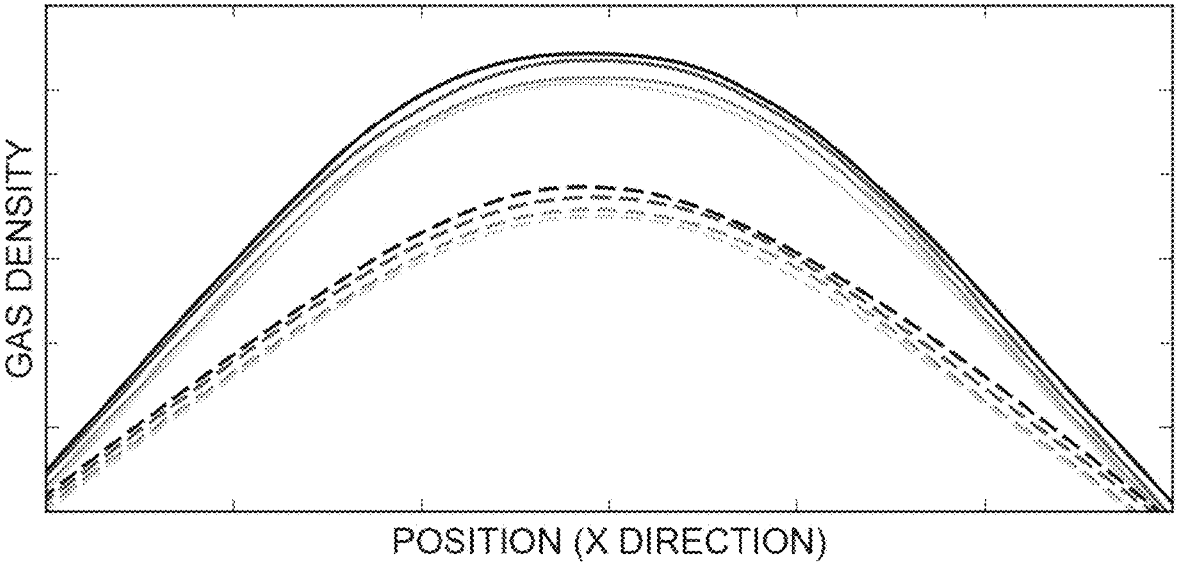
Figure 8:
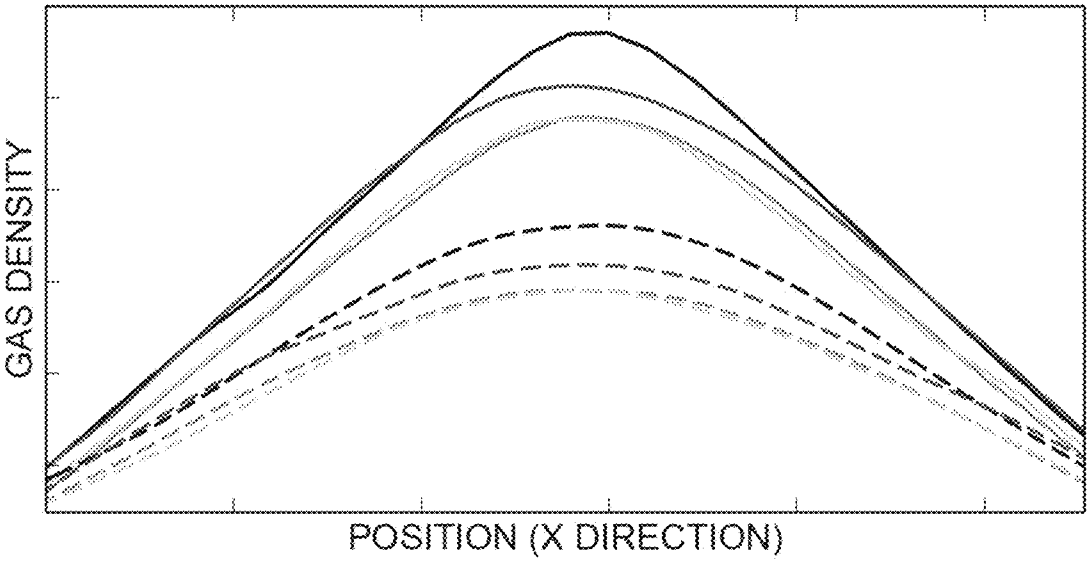

FIG. 8(*a*) is a graph illustrating a density profile of a supersonic gas flow in the vicinity of an outlet of a supersonic nozzle in the first example. FIG. 8(*b*) is a graph illustrating a density profile of a supersonic gas flow in the vicinity of an outlet of a supersonic nozzle in the first comparative example.

Figure 9:
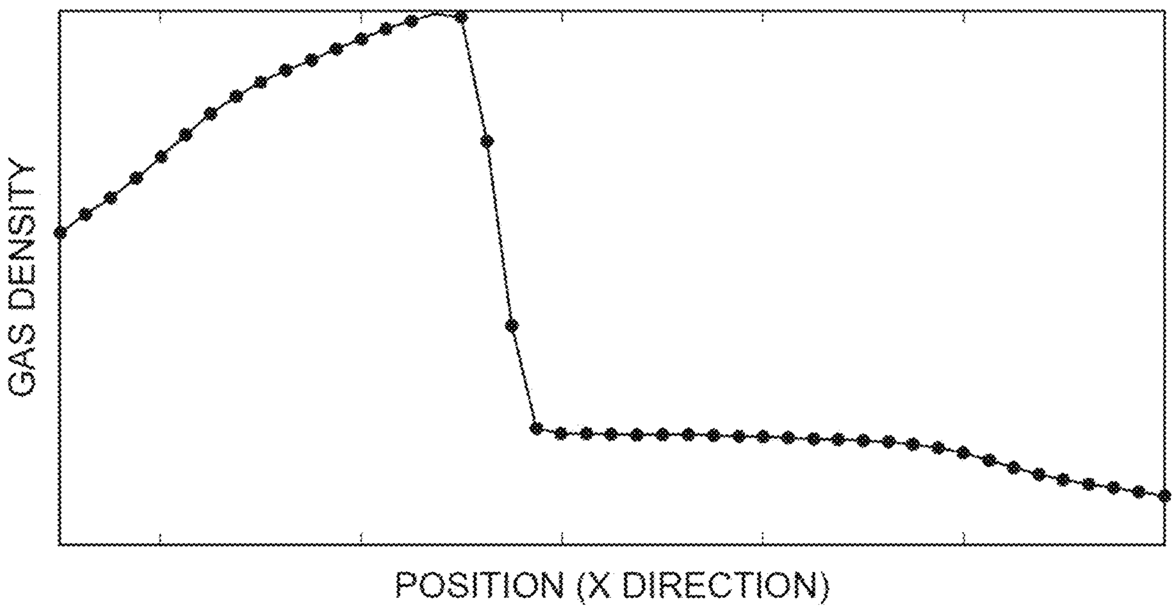
Figure 9:
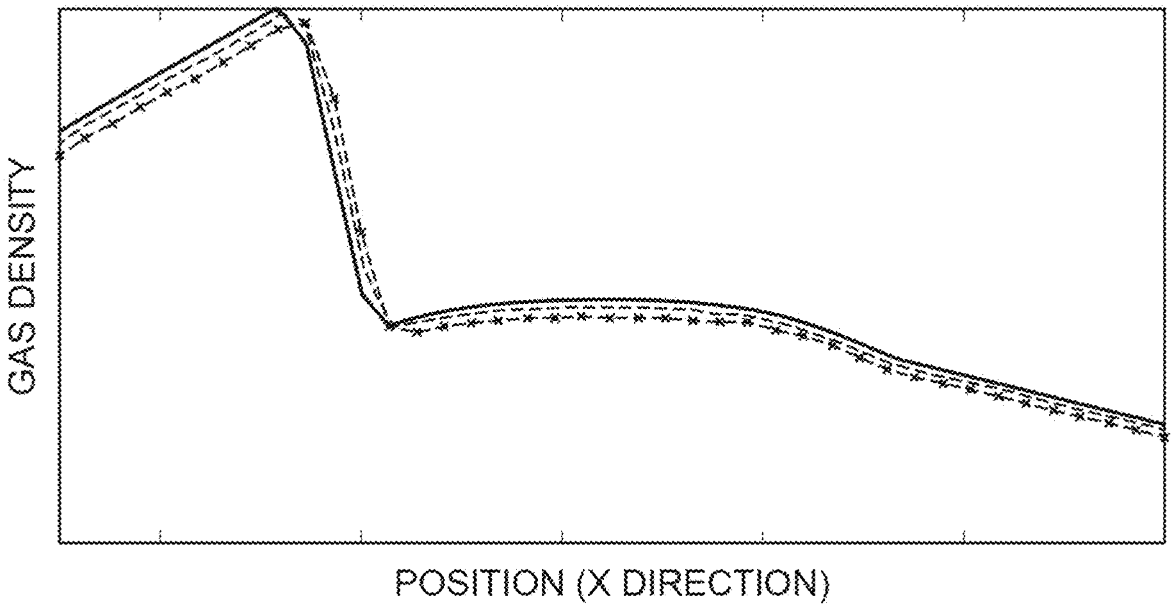

FIG. 9(*a*) is a graph illustrating a density profile of a shock wave in the first example. FIG. 9(*b*) is a graph illustrating a density profile of a shock wave in the first comparative example.

Figure 10:
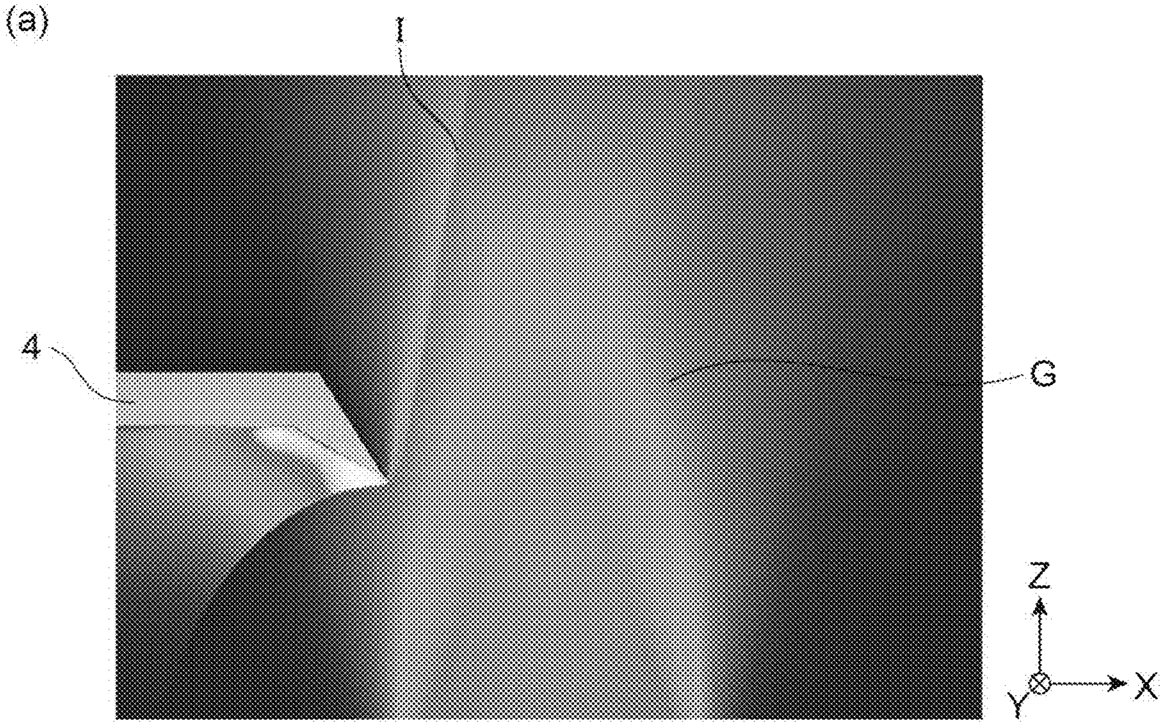
Figure 10:
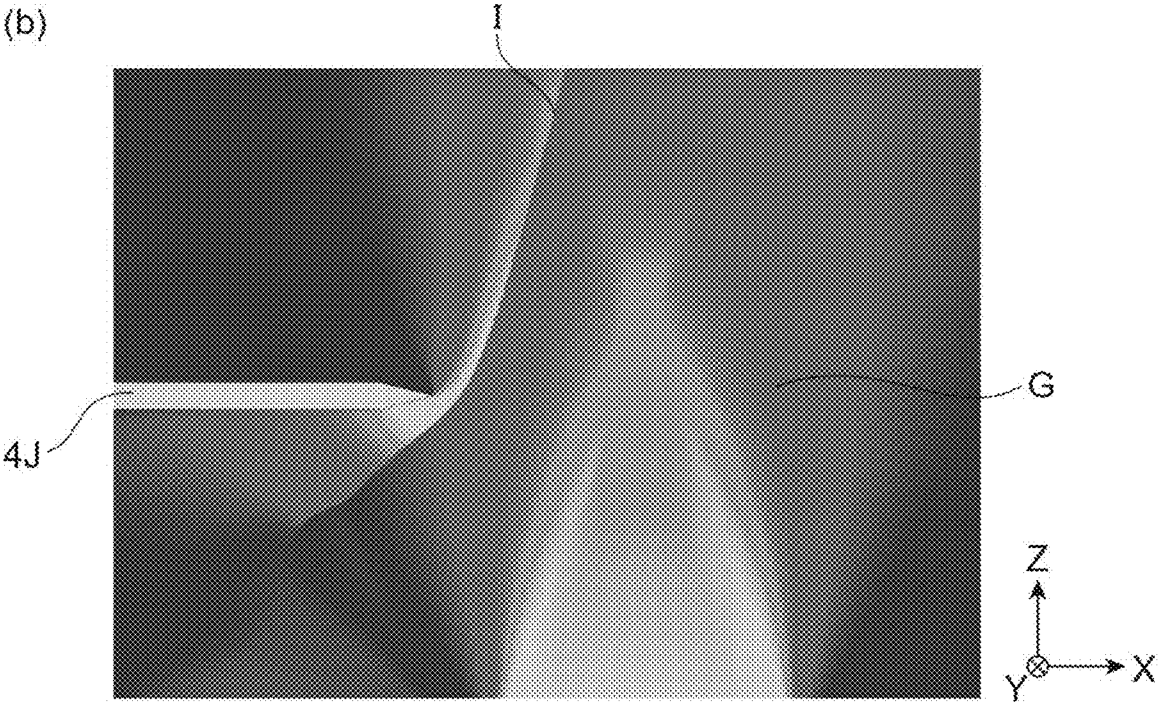

FIG. 10(*a*) is a diagram illustrating a density distribution of the supersonic gas flow in the first example. FIG. 10(*b*) is a diagram illustrating a density distribution of a supersonic gas flow in a second comparative example.

Figure 11:
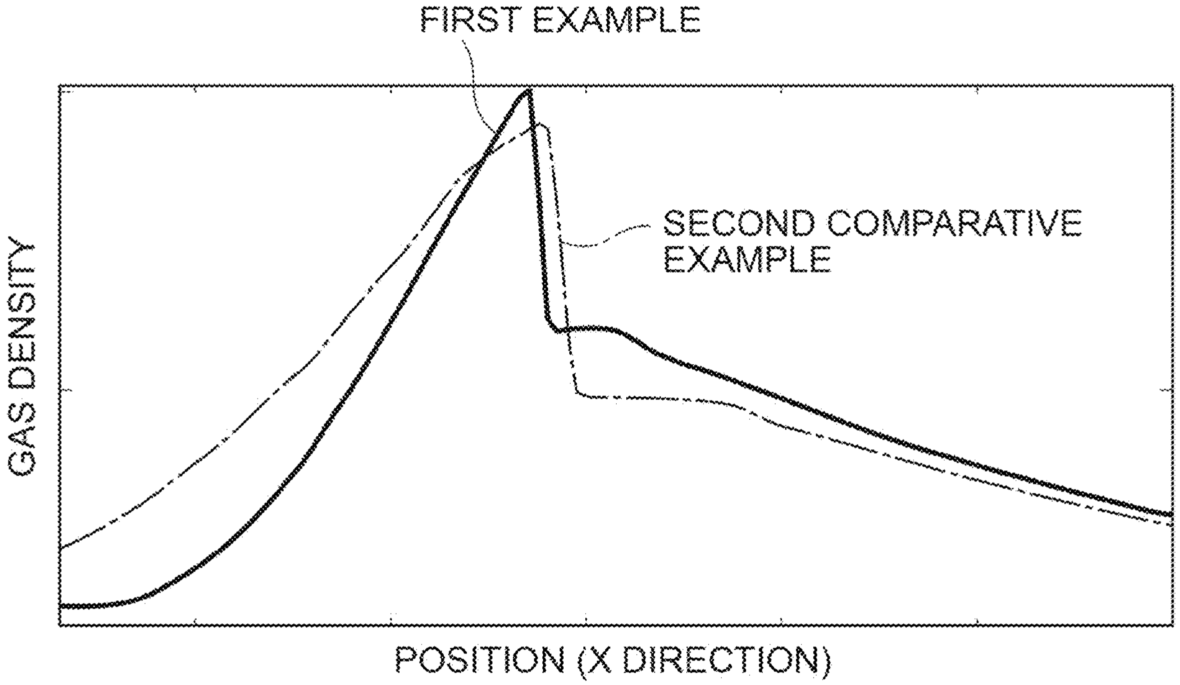

FIG. 11 is a graph illustrating density profiles of shock waves in the first example and the second comparative example.

Figure 12:
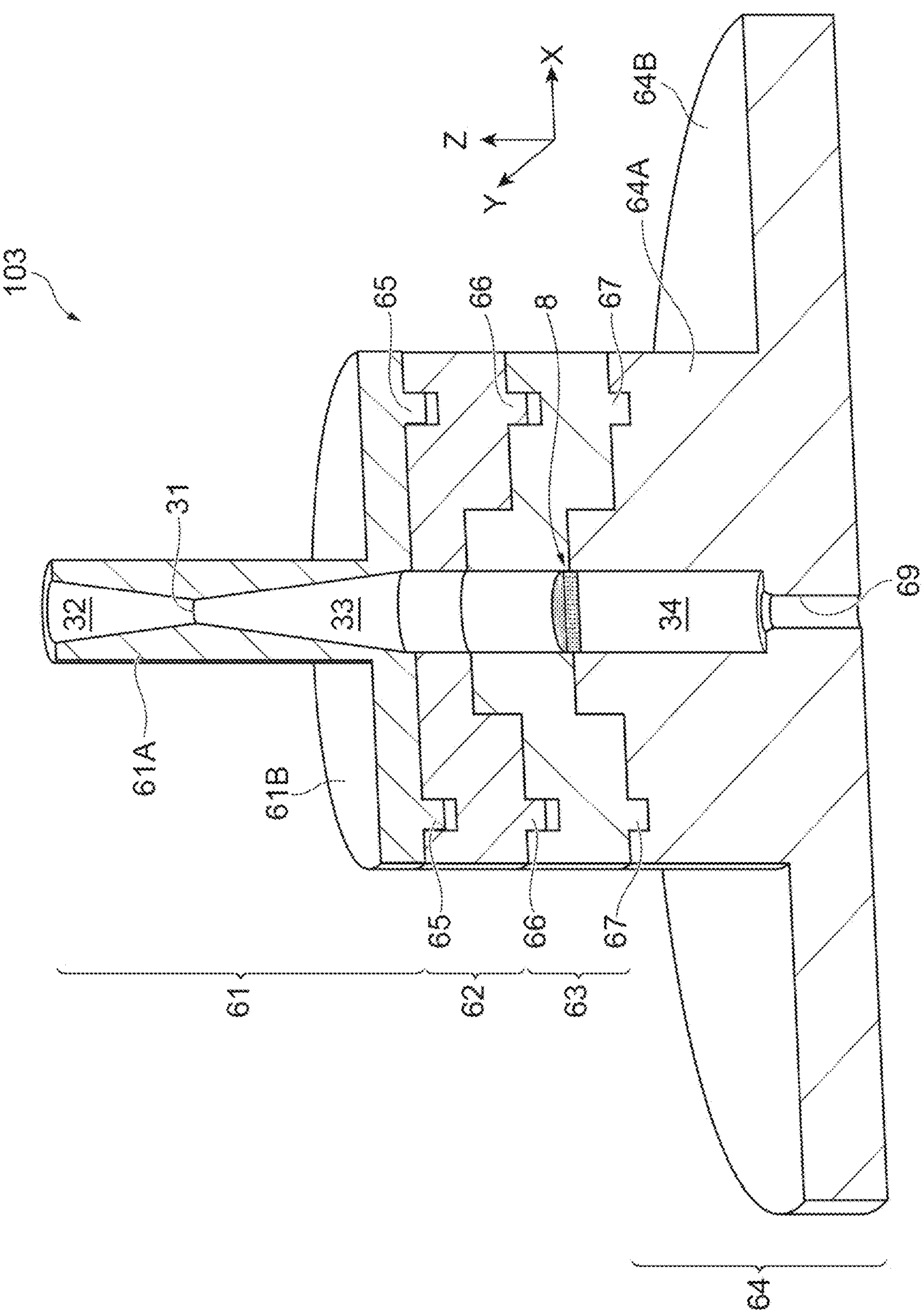

FIG. 12 is a cross-sectional view illustrating an internal structure of a supersonic nozzle according to a second embodiment.

Figure 13:
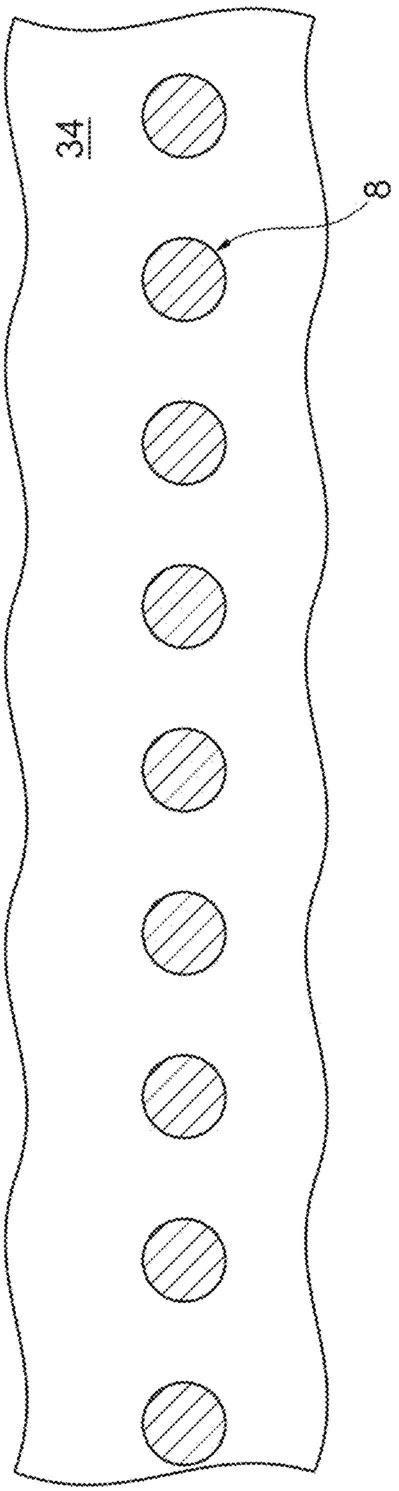

FIG. 13 is an end view illustrating a mesh member in FIG. 12.

Figure 14:
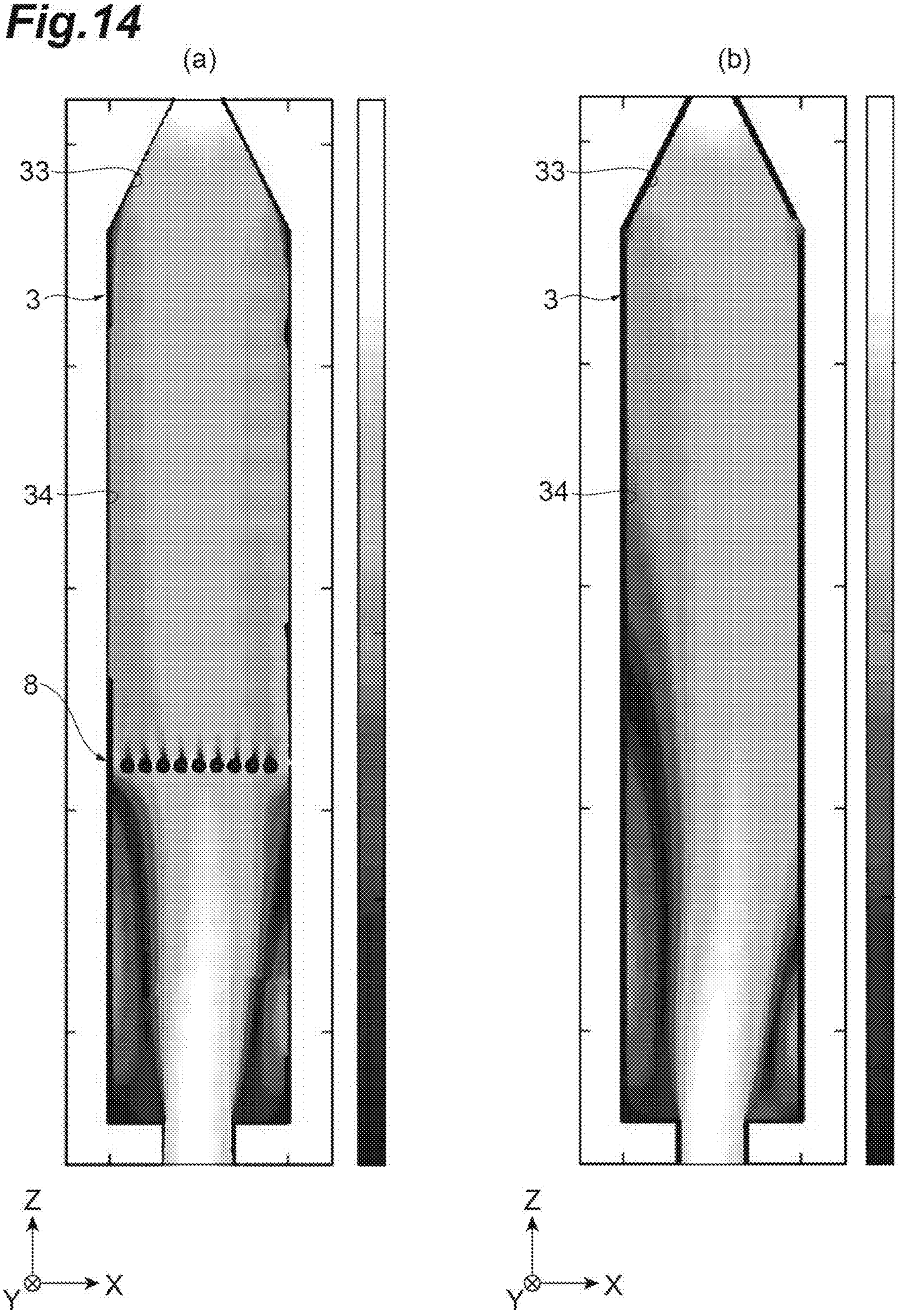

FIG. 14(*a*) is a diagram illustrating a density distribution of a gas inside a supersonic nozzle in a second example. FIG. 14(*b*) is a diagram illustrating a density distribution of a gas inside a supersonic nozzle in a first example.

Figure 15:
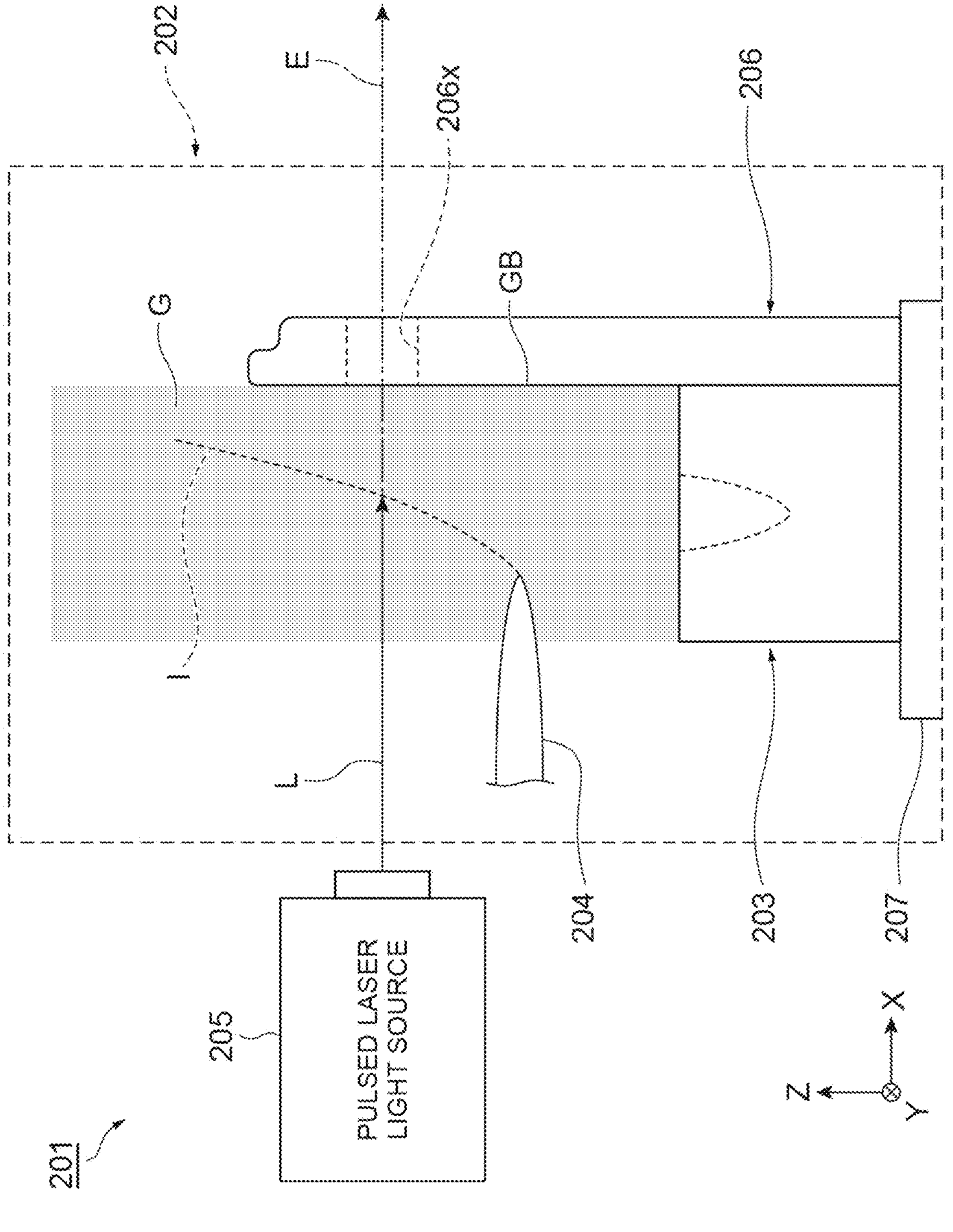

FIG. 15 is a schematic configurational diagram illustrating an electron beam generation apparatus according to a third embodiment.

Figure 16:
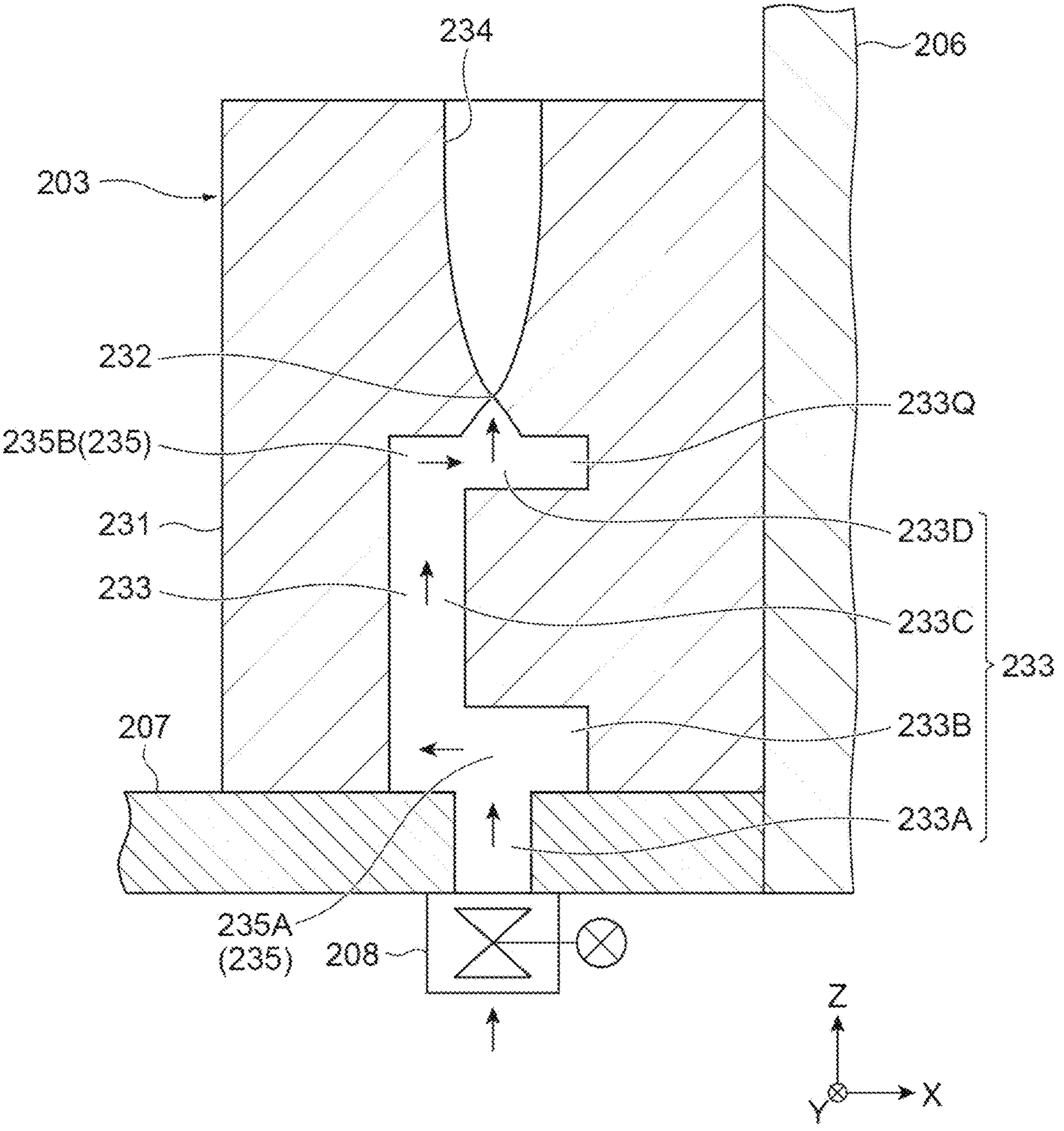

FIG. 16 is a cross-sectional view illustrating an internal structure of a supersonic nozzle in FIG. 15.

Figure 17:
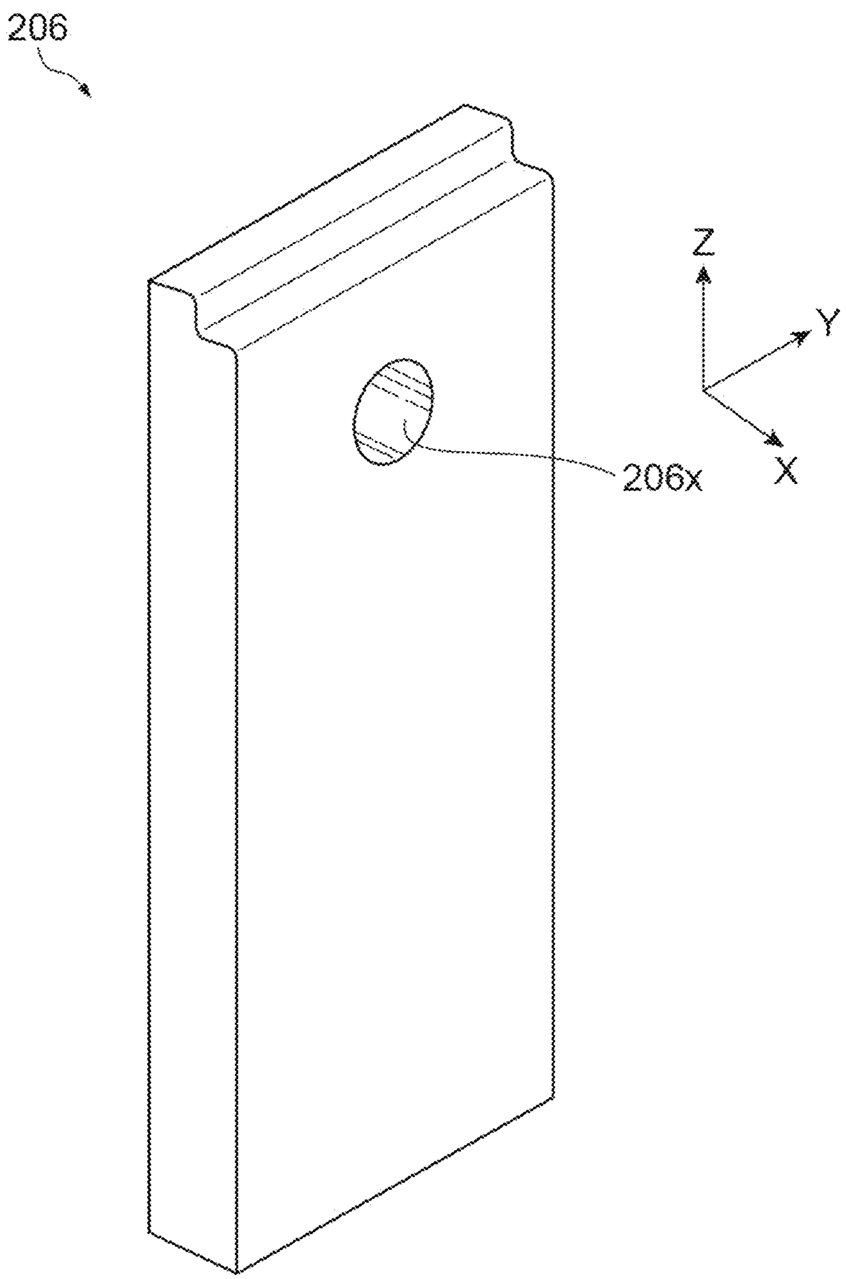

FIG. 17 is a perspective view illustrating a back plate in FIG. 15.

Figure 18:
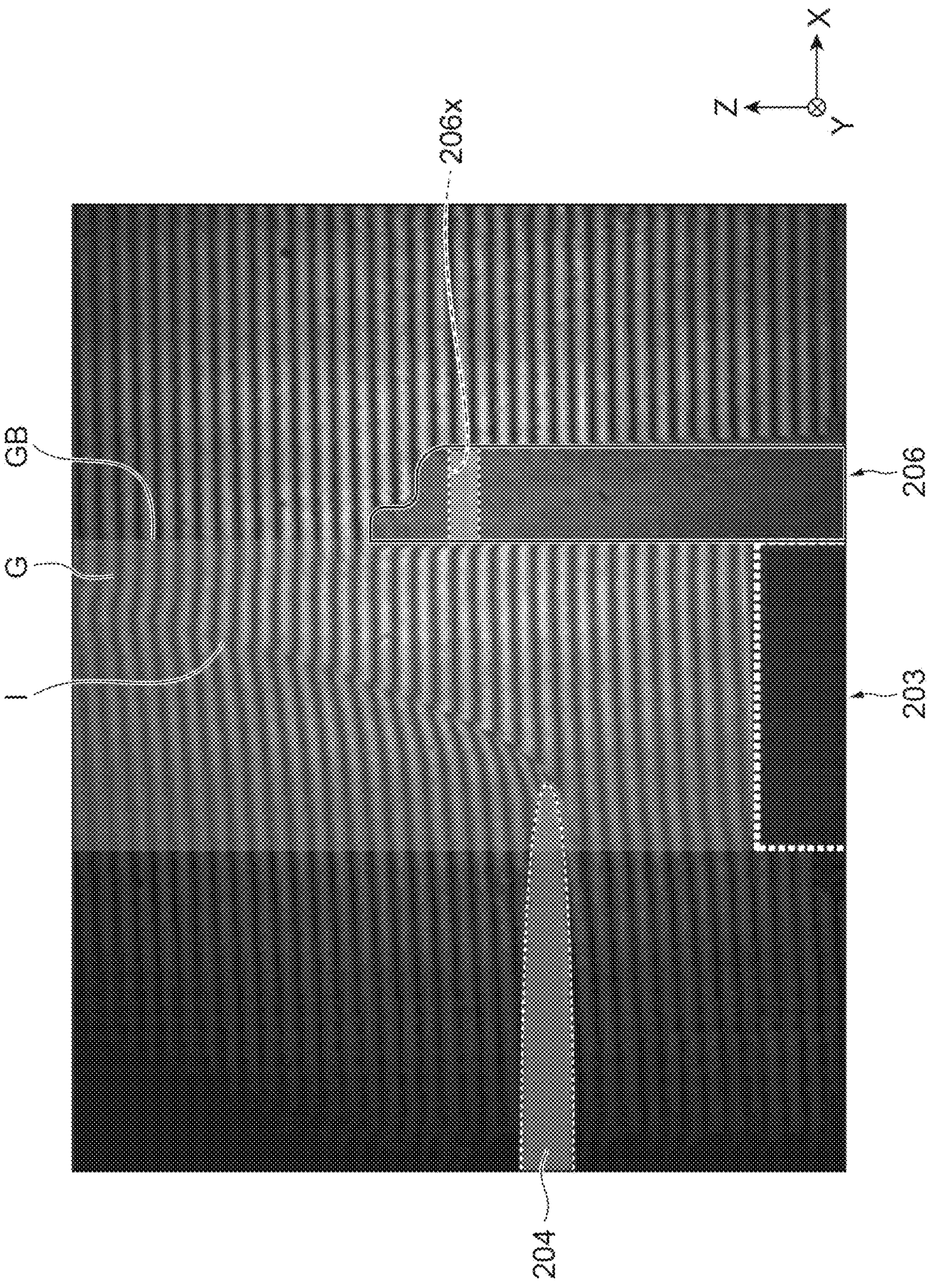

FIG. 18 is a diagram illustrating a state in a supersonic gas flow for description of an electron beam generation method.

Figure 19:
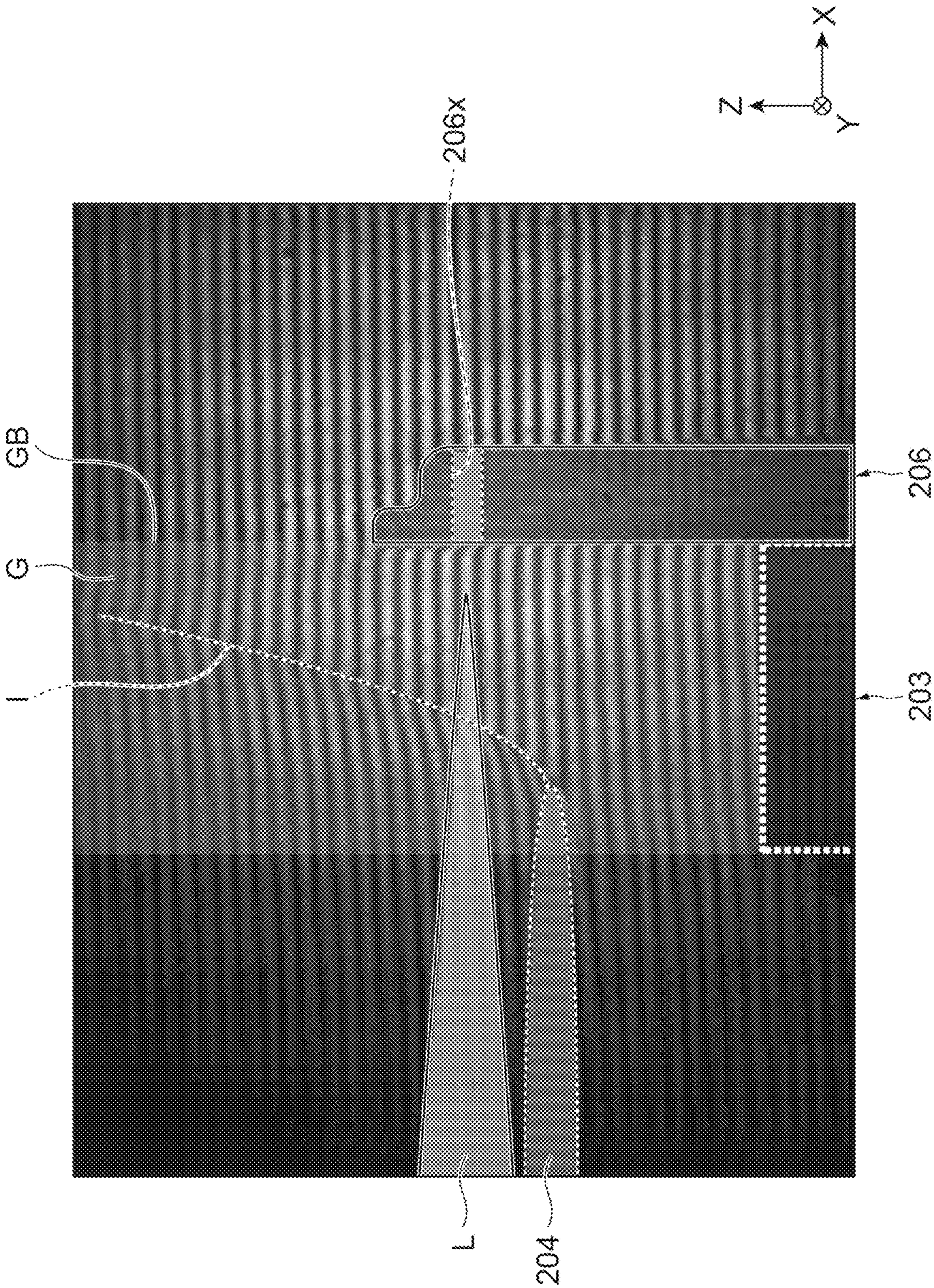

FIG. 19 is a diagram illustrating a continuation from FIG. 18.

Figure 20:
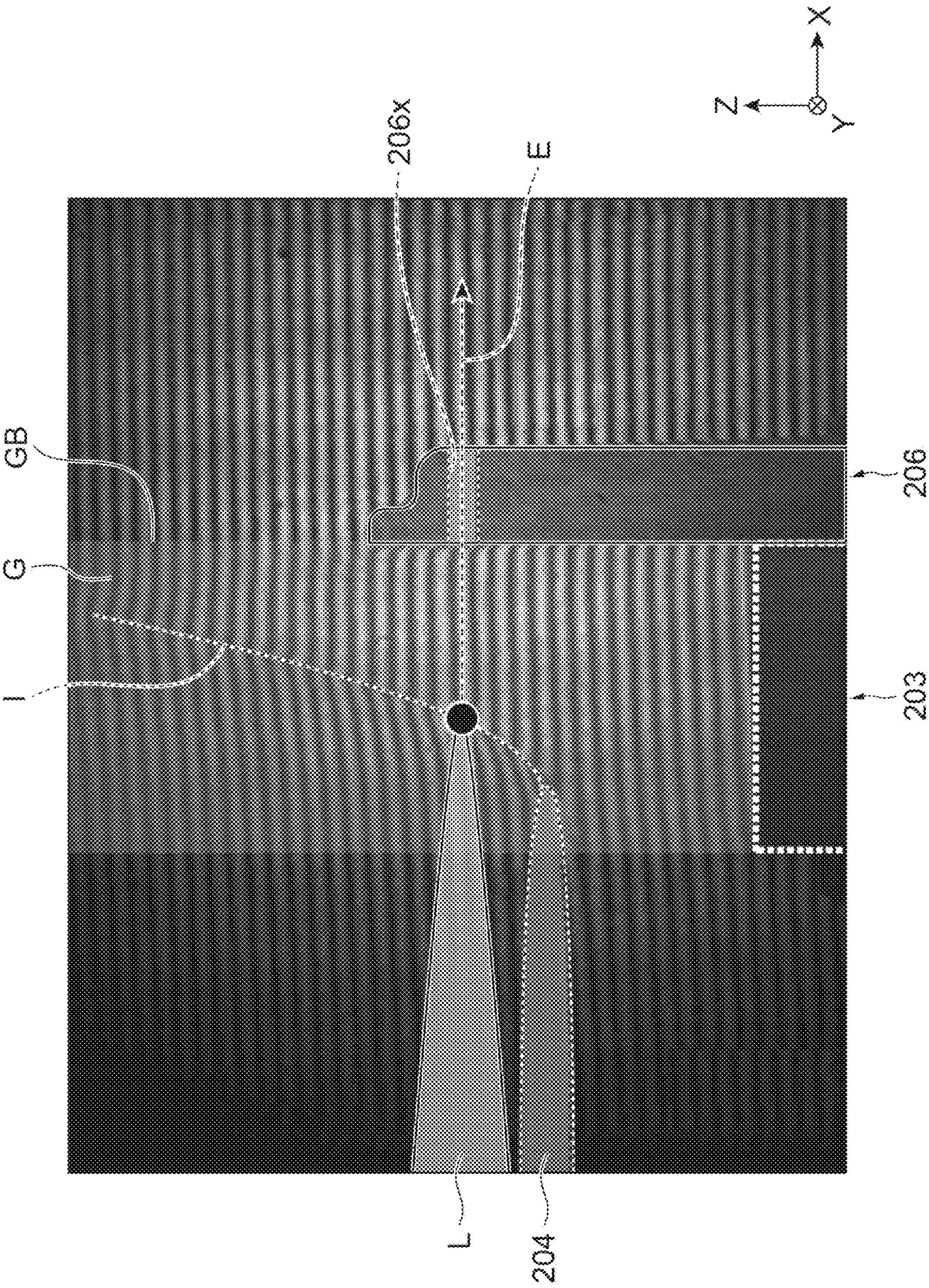

FIG. 20 is a diagram illustrating a continuation from FIG. 19.

Figure 21:
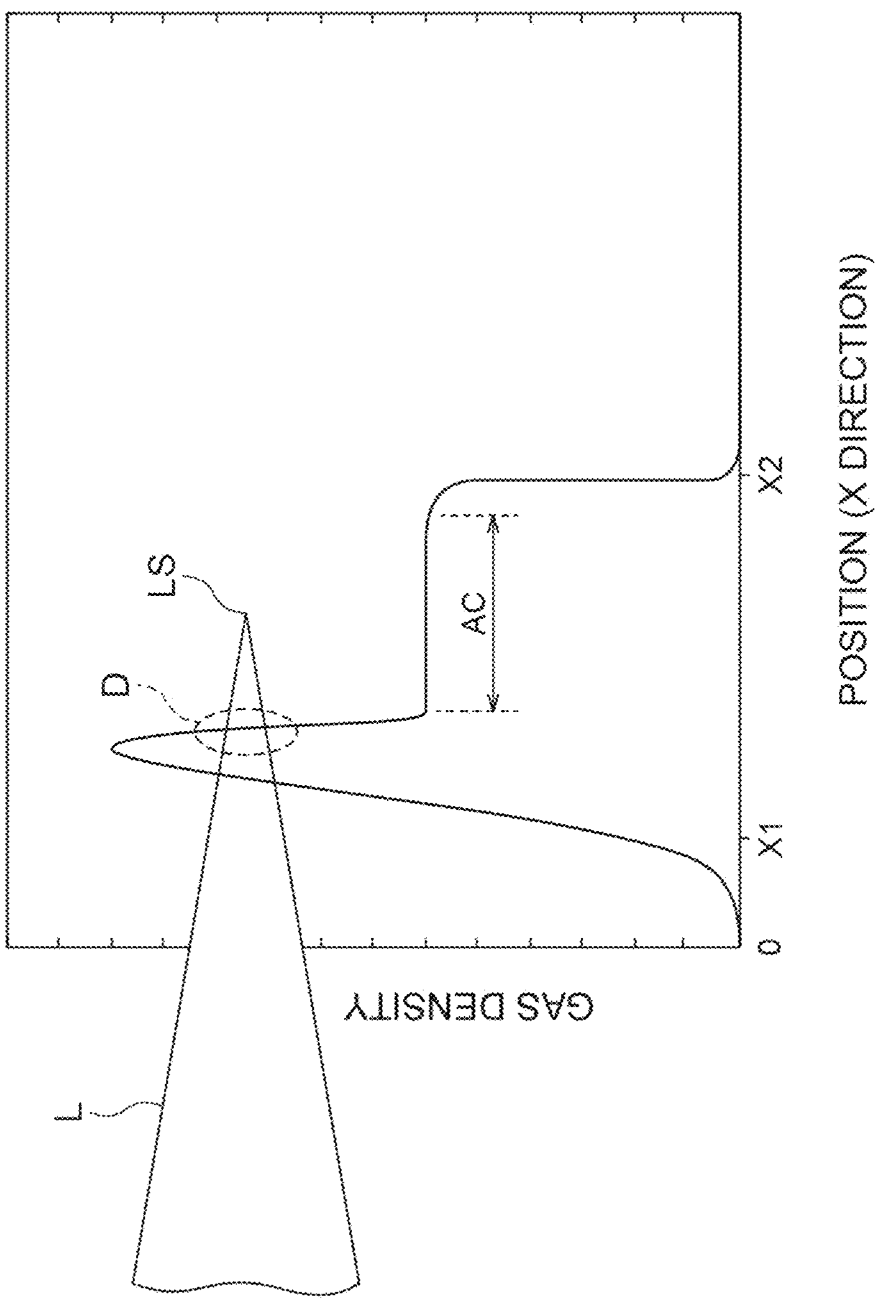

FIG. 21 is a graph illustrating a gas density distribution of a supersonic gas flow in an X direction.

Figure 22:
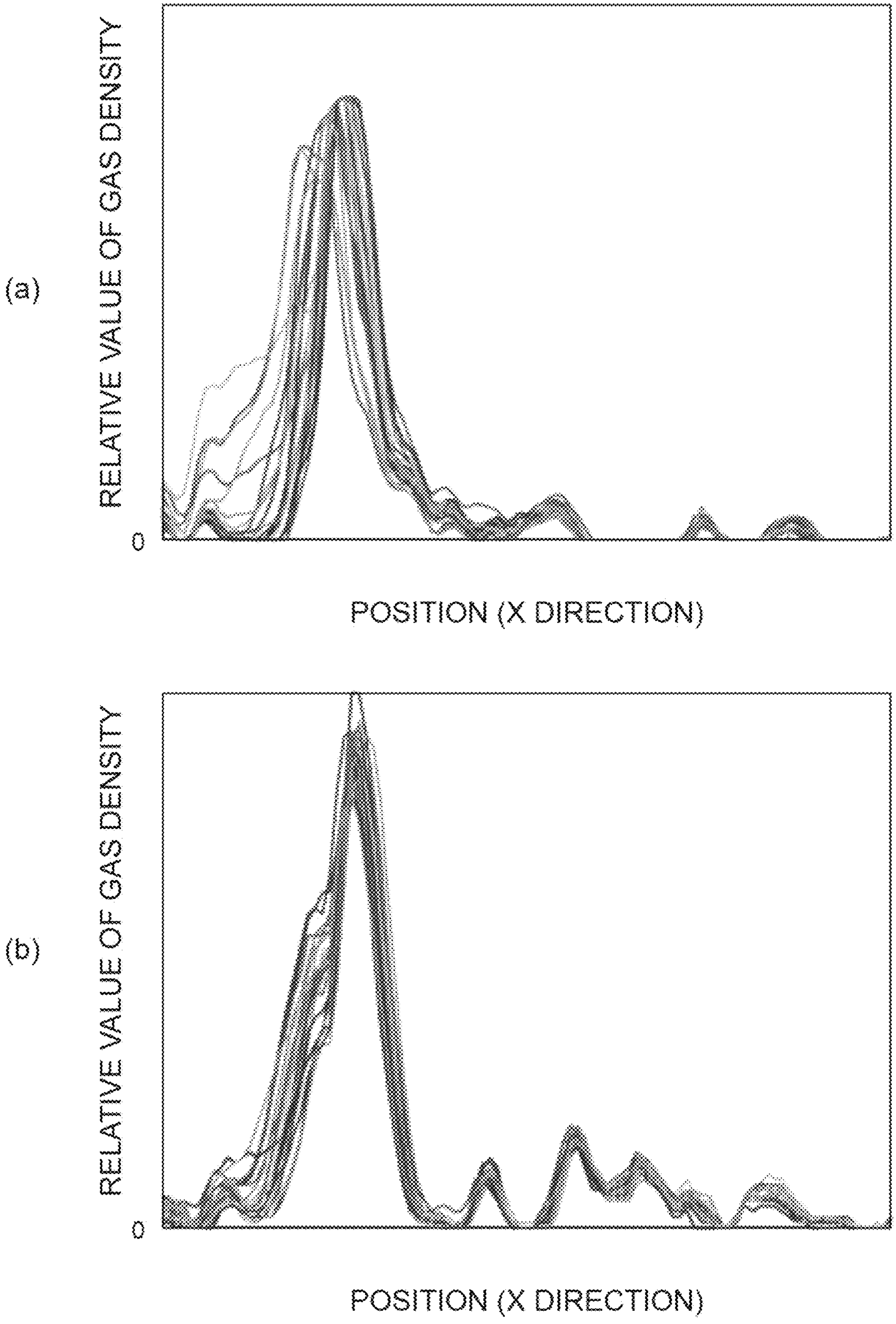

FIG. 22(*a*) is a graph illustrating variations in a position of a shock front when an electron beam is repeatedly generated in a third comparative example. FIG. 22(*b*) is a graph illustrating variations in a position of a shock front when an electron beam is repeatedly generated in a third example.

Figure 23:
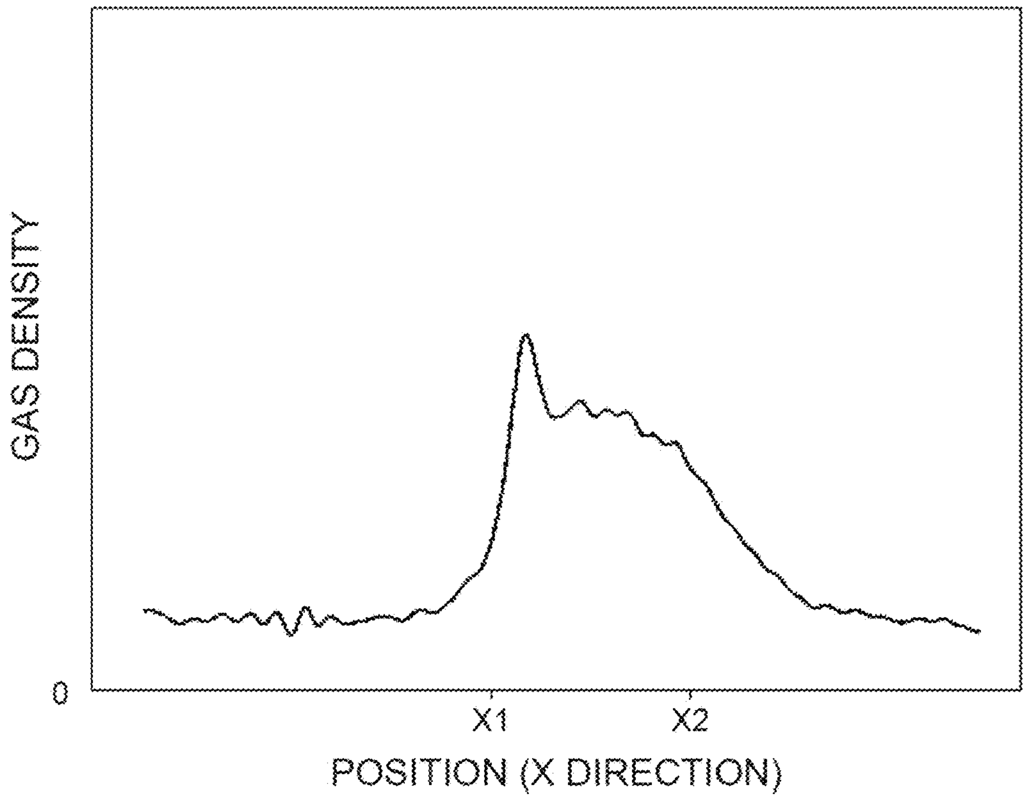
Figure 23:
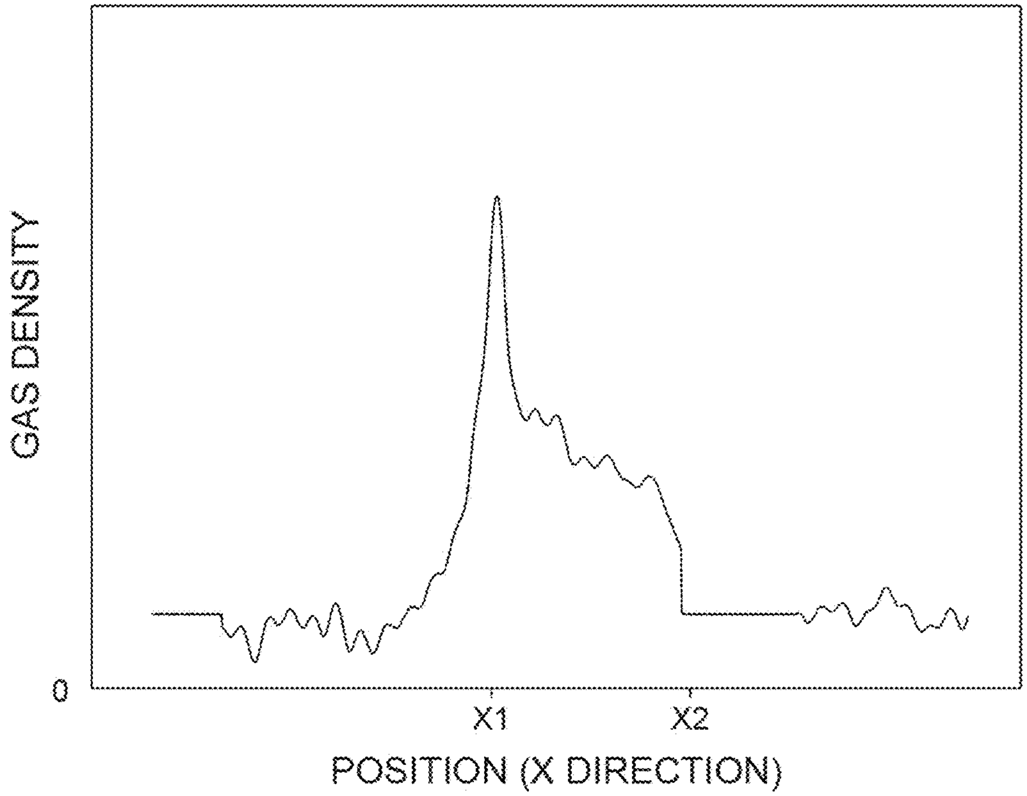

FIG. 23(*a*) is a graph illustrating a gas density distribution in the third comparative example. FIG. 23(*b*) is a graph illustrating a gas density distribution in the third example.

Figure 24:
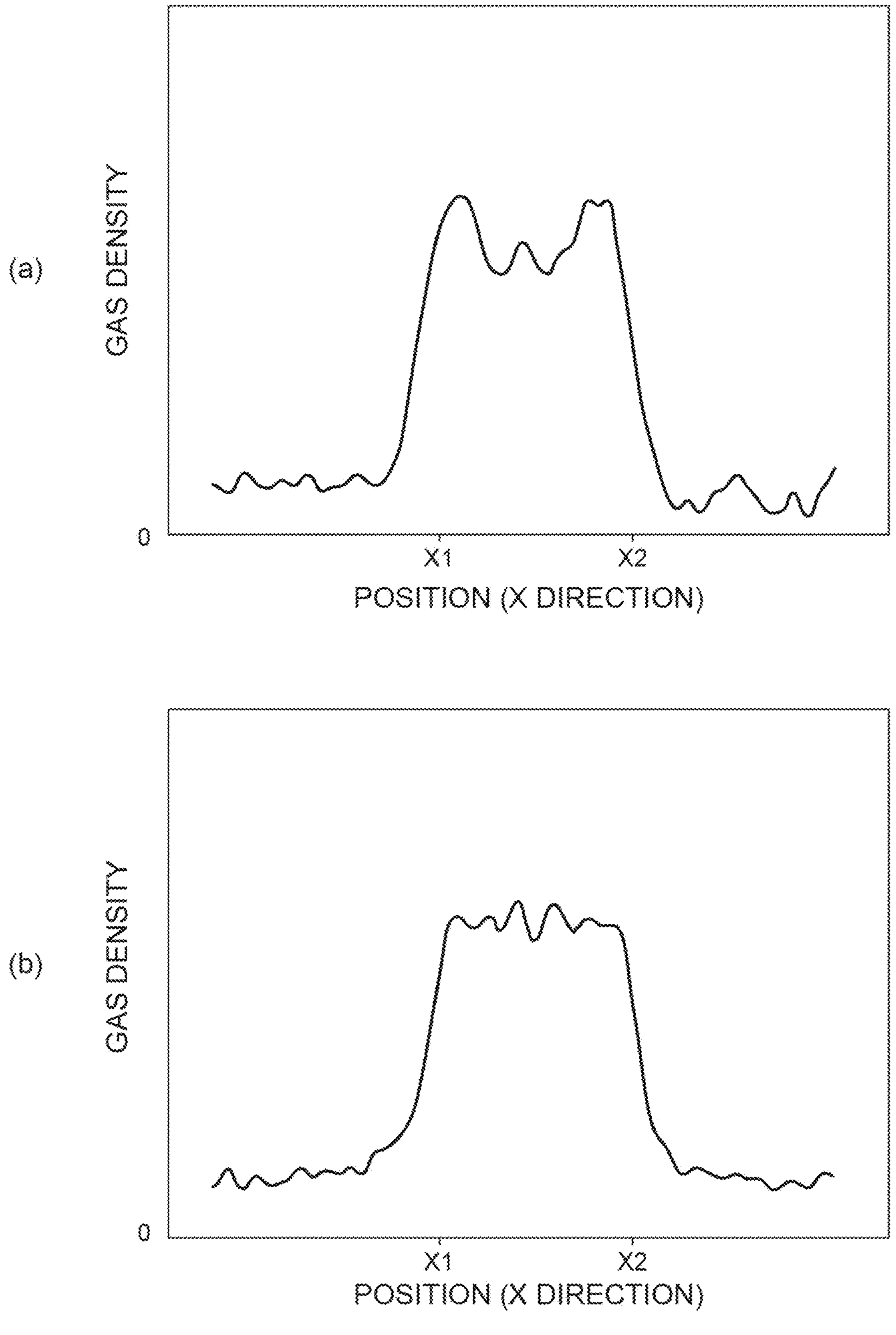

FIG. 24(*a*) is a graph illustrating a gas density distribution in a state before a knife edge is inserted in a third comparative example. FIG. 24(*b*) is a graph illustrating a gas density distribution in a state before a knife edge is inserted in the third example.

Figure 25:
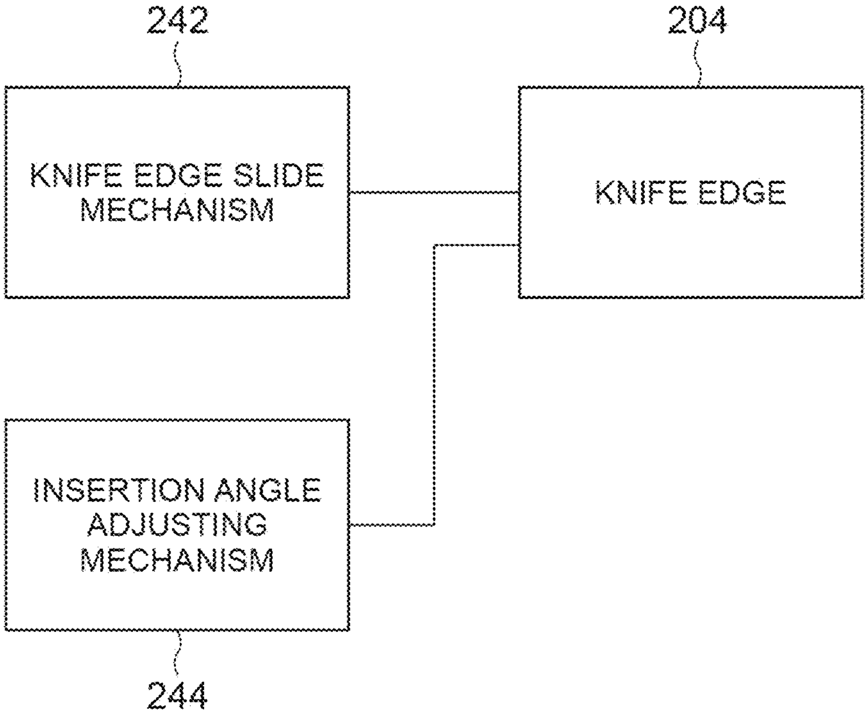

FIG. 25 is a block diagram illustrating a modification example of a configuration according to the knife edge.

Figure 26:
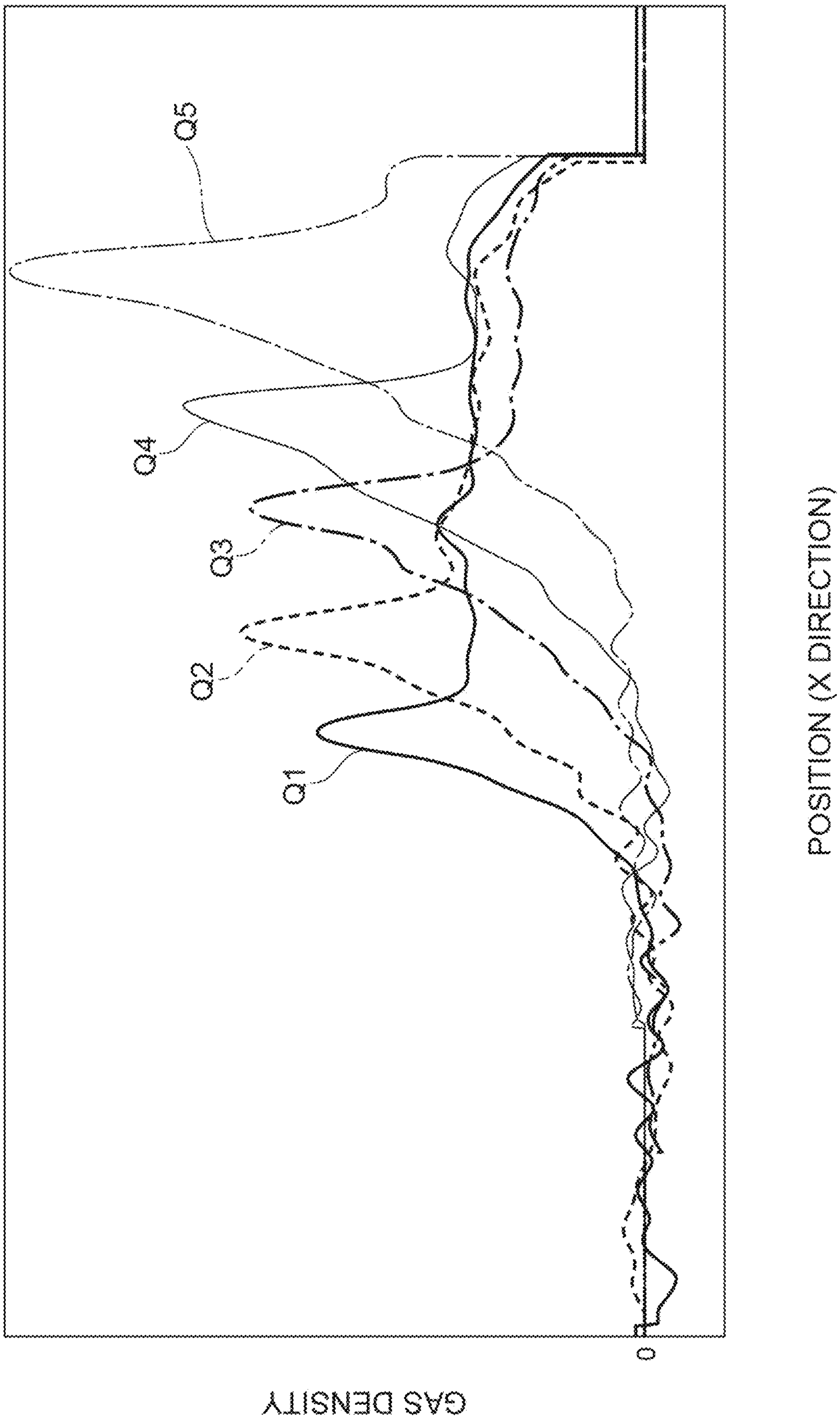

FIG. 26 is a graph illustrating a gas density distribution of a supersonic gas flow in the X direction in a case where an insertion length is changed.

Figure 27:
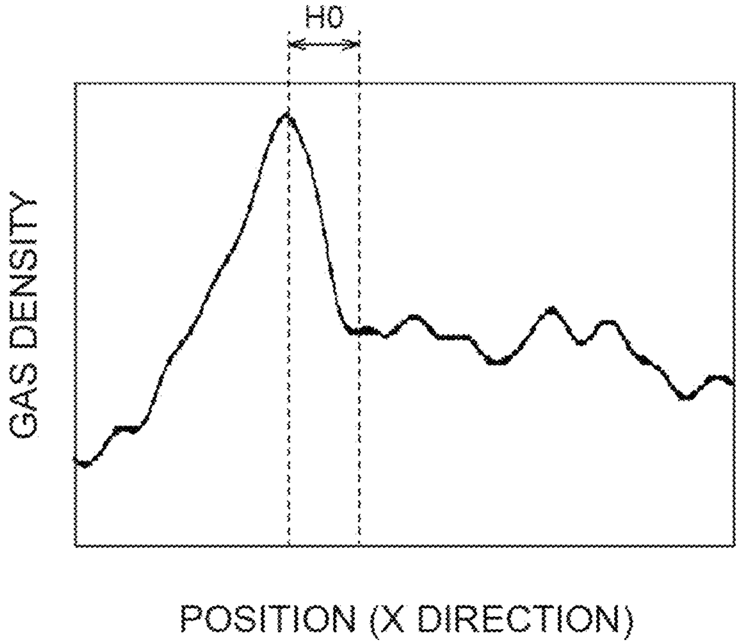
Figure 27:
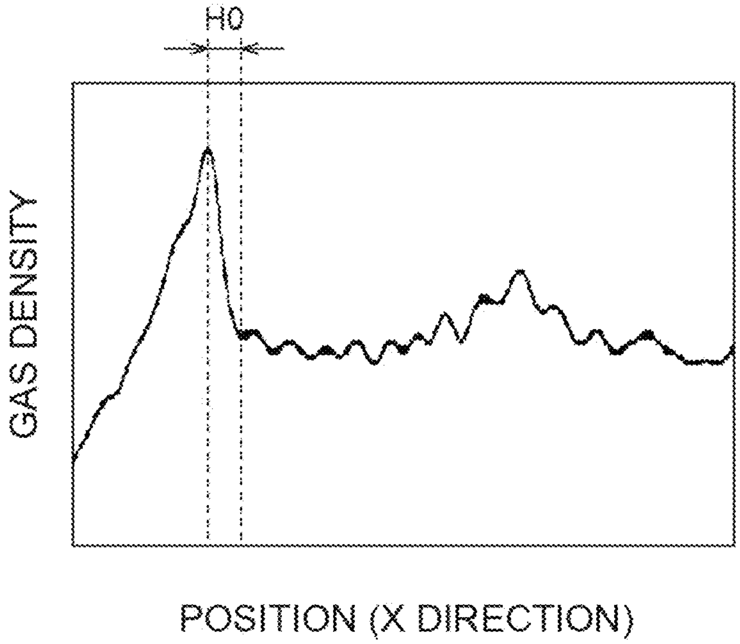

FIG. 27(*a*) is a graph illustrating a gas density distribution in a case where an insertion angle is 0°. FIG. 27(*b*) is a graph illustrating a gas density distribution in a case where the insertion angle is α.

Figure 28:
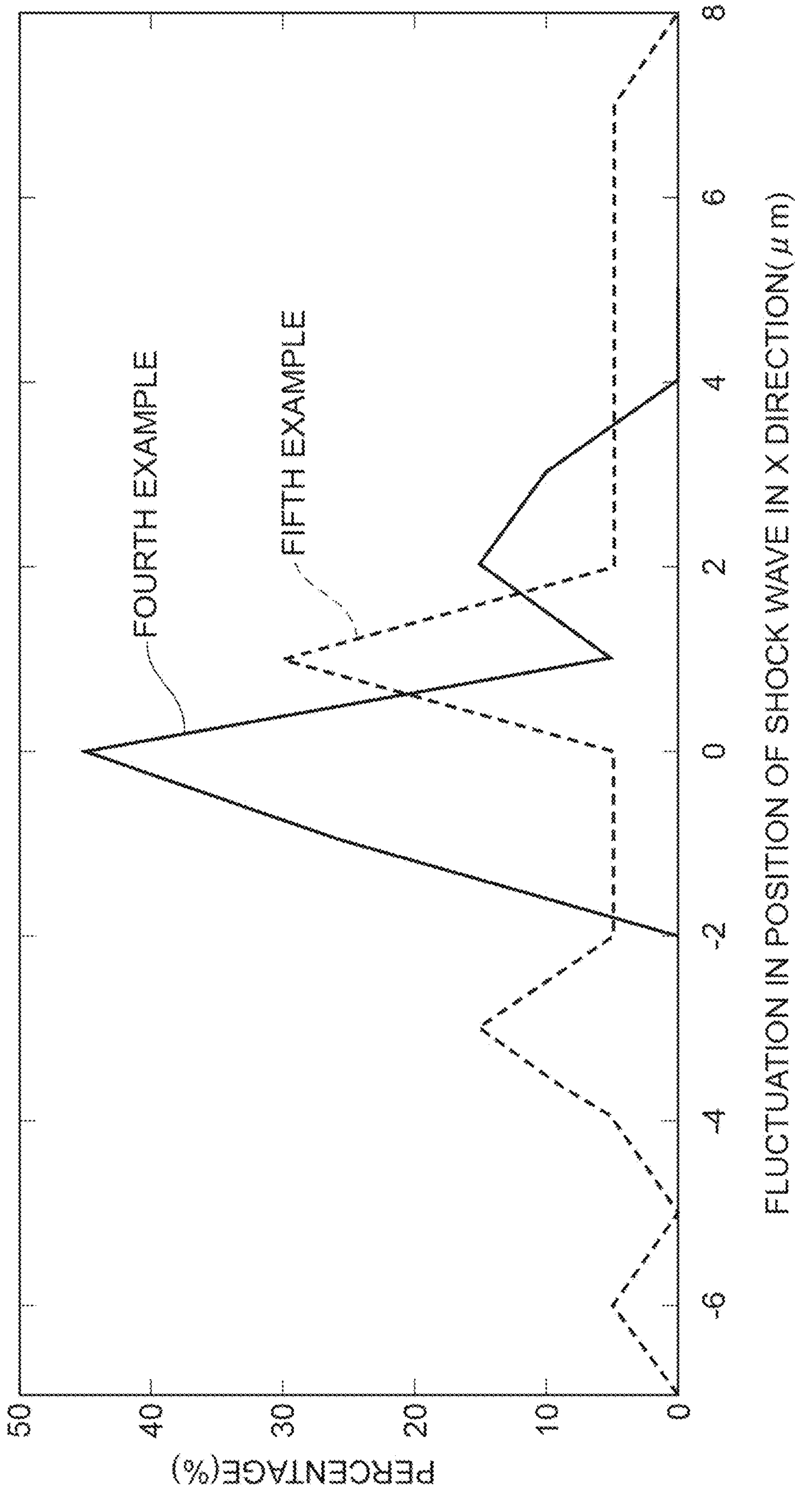

FIG. 28 is a graph illustrating an experimental result of a position of a shock wave in the X direction in a fourth example and a fifth example.

Figure 29:
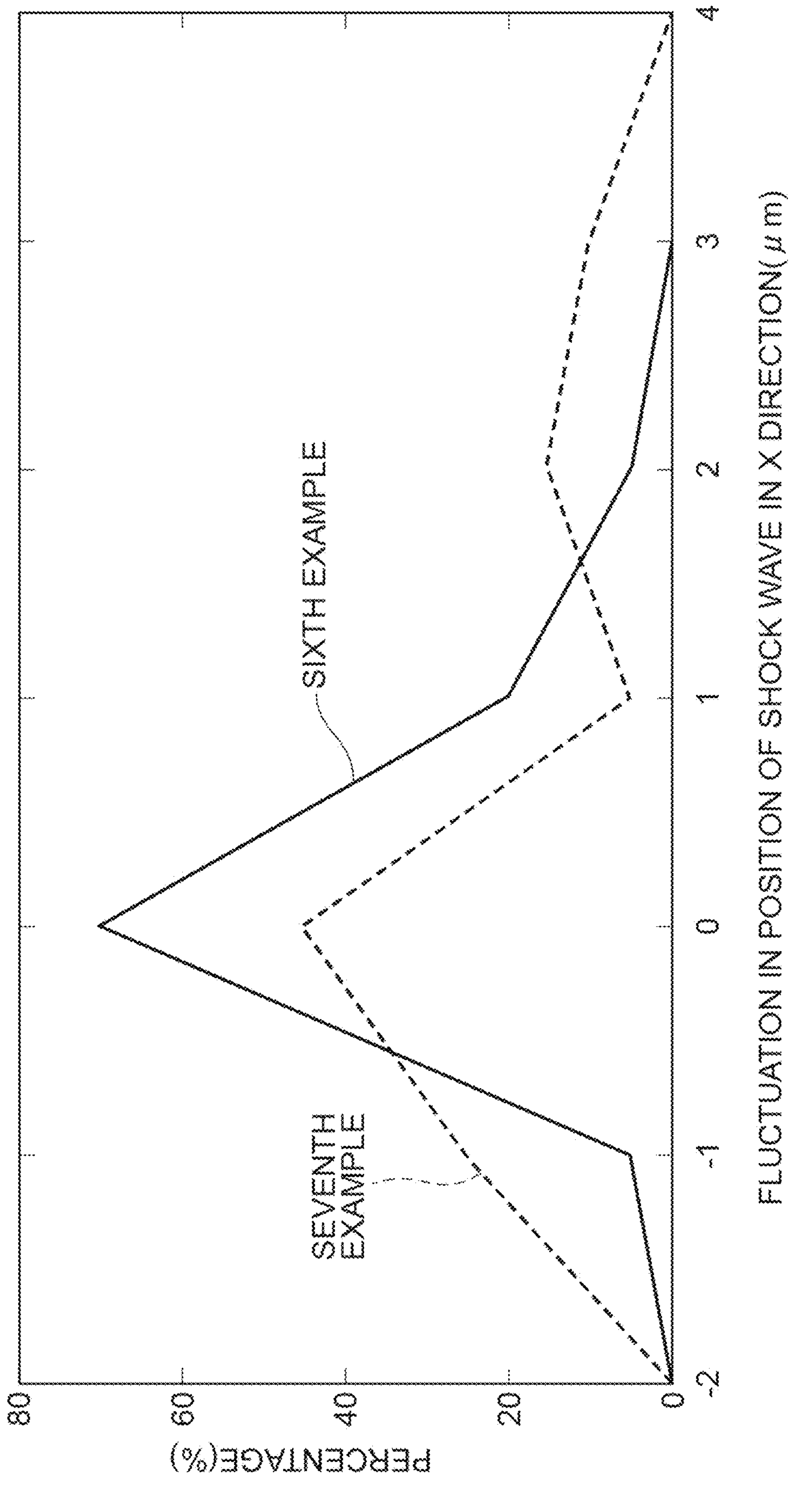

FIG. 29 is a graph illustrating an experimental result of a position of a shock wave in the X direction in a sixth example and a seventh example.

DESCRIPTION OF EMBODIMENTS

Hereinafter, embodiments will be described with reference to the drawings. In the following description, the same or corresponding elements are denoted by the same reference numerals, and redundant descriptions thereof are omitted. An X direction, a Y direction, and a Z direction are set for convenience based on an illustrated state.

First Embodiment

Figure 1:
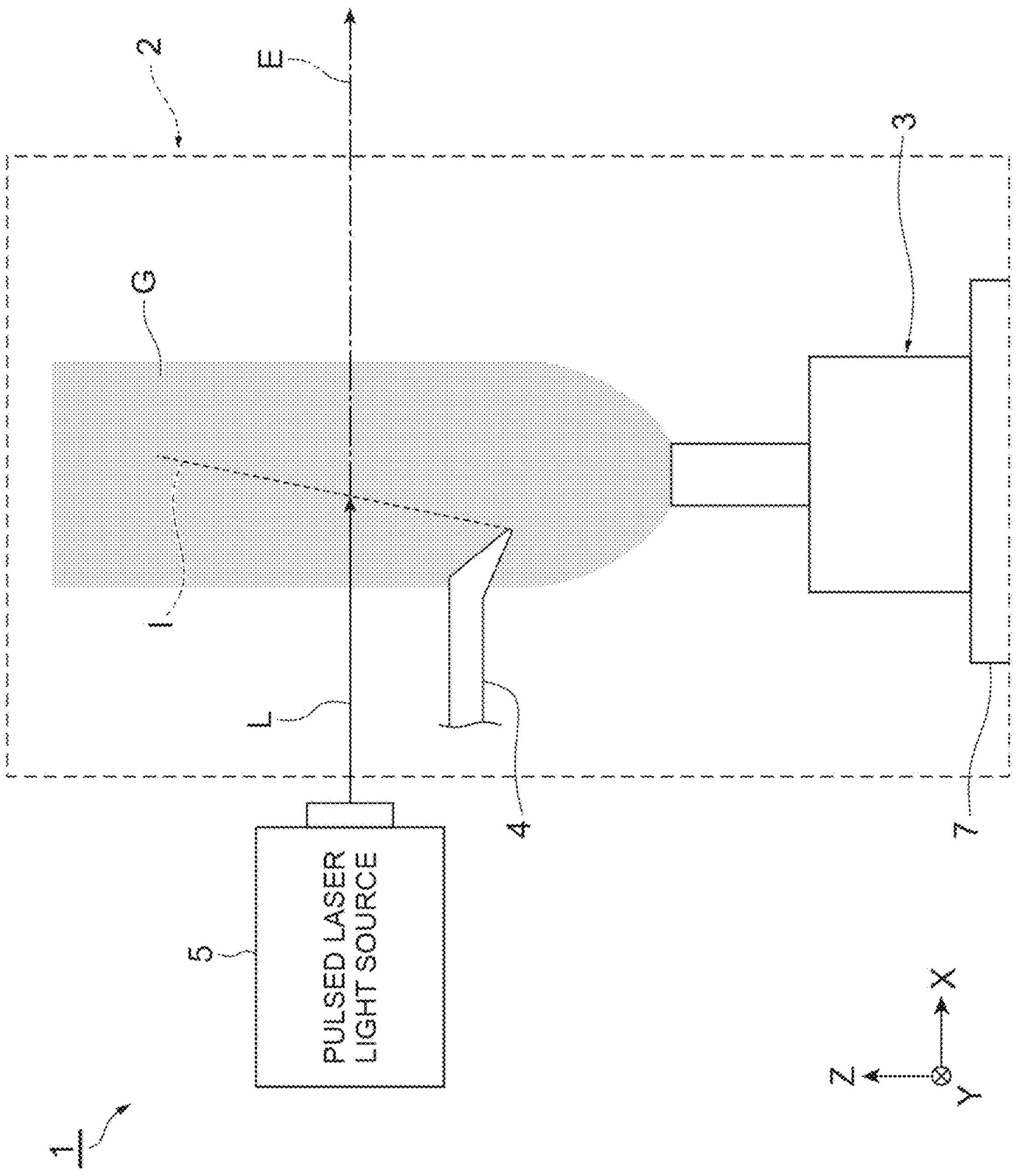
FIG. 1 is a schematic configurational diagram illustrating an electron beam generation apparatus according to a first embodiment.

As illustrated in FIG. 1, an electron beam generation apparatus 1 is an apparatus that generates an electron beam E for being radiated to a target subject. The target subject is not particularly limited, and examples thereof include a prodrug in a patient's body. In this case, the electron beam E acts as a trigger for changing the prodrug in the patient's body into an active substance. The prodrug is not particularly limited, and examples thereof include a prodrug that passes through the blood-brain barrier (a mechanism that restricts transit of a substance from blood to brain tissue).

The electron beam E generated by the electron beam generation apparatus 1 may have an energy higher than 1 MeV, an energy higher than 10 MeV, or an energy higher than 200 MeV. In a case where the target subject is a patient, the electron beam E may have an energy higher than 10 MeV. The electron beam generation apparatus 1 according to this embodiment generates the electron beam E by propagating pulsed laser light L in a supersonic gas flow G. The electron beam generation apparatus 1 includes a vacuum vessel 2, a supersonic nozzle 3, a knife edge 4, and a pulsed laser light source (radiation unit) 5.

The vacuum vessel 2 is a vessel having a vacuum internal space. The supersonic nozzle 3 is a nozzle that ejects, into an internal space of the vacuum vessel 2, the supersonic gas flow G in the Z direction which is a first direction. That is, the supersonic nozzle 3 generates the supersonic gas flow G flowing in the Z direction under a vacuum atmosphere. The supersonic gas flow G is a flow of a gas (a gas flow) flowing at supersonic speed. For example, hydrogen gas can be used as the supersonic gas flow G. The supersonic nozzle 3 is not particularly limited, and an axisymmetric conical nozzle can be used.

Figure 2:
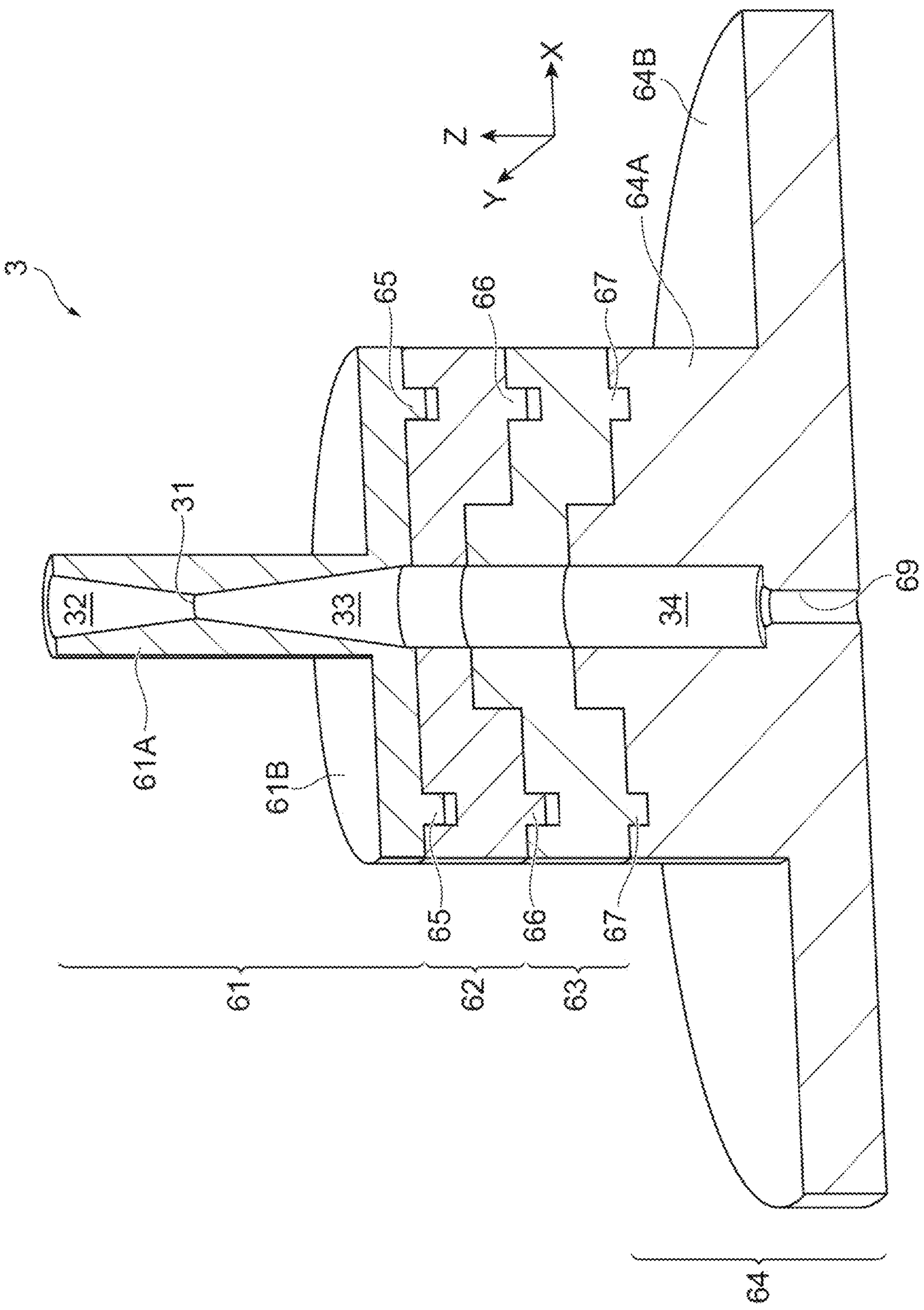
FIG. 2 is a cross-sectional view illustrating an internal structure of a supersonic nozzle in FIG. 1.

As illustrated in FIGS. 1 and 2, the supersonic nozzle 3 includes a throat 31, a divergence portion 32, a convergence portion 33, and a flow straightening chamber 34. The throat 31, the divergence portion 32, the convergence portion 33, and the flow straightening chamber 34 flows a gas in the Z direction. The throat 31 chokes a flow of a flowing gas. The throat 31 is a part having the smallest flow channel cross-sectional area in the supersonic nozzle 3.

The divergence portion 32 is a portion having an upstream end forming the throat 31 and a downstream end having a flow channel cross-sectional area larger than a cross-sectional area of the throat 31. The divergence portion 32 allows a flow of a gas choked at the throat 31 to diverge. The divergence portion 32 has a circular flow channel cross section. The downstream end of the divergence portion 32 forms an outlet of the supersonic gas flow G. The convergence portion 33 is a portion having a downstream end forming the throat 31 and an upstream end having a flow channel cross-sectional area larger than a cross-sectional area of the throat 31. The convergence portion 33 allows a flow of a gas to converge toward the throat 31. The convergence portion 33 has a circular flow channel cross section.

The flow straightening chamber 34 is a portion that is smoothly connected to the upstream end of the convergence portion 33 and extend by a predetermined length. The flow straightening chamber 34 has a circular flow channel cross section and has a diameter equal to that of the upstream end of the convergence portion 33. The flow straightening chamber 34 linearly extends in the Z direction, and has a constant flow channel cross-sectional area in the Z direction. The flow straightening chamber 34 has a function of straightening a flow of a gas in the Z direction. The flow straightening chamber 34 may have a predetermined length of 10 mm or longer, 20 mm or longer, or 30 mm or longer. The predetermined length in this embodiment is 20 mm. For example, the predetermined length of 10 mm or longer corresponds to three times or more a length of the convergence portion 33 in the Z direction.

The supersonic nozzle 3 is configured to be dividable into an upper end member 61, a first middle member 62, a second middle member 63, and a bottom member 64. The supersonic nozzle 3 is made of, for example, stainless steel or titanium. The upper end member 61 is a member having a cylindrical part 61A having an axial direction parallel to the Z direction, and a disk-shaped flange 61B which is provided at an upstream end portion of the cylindrical part 61A and has an axial direction parallel to the Z direction. The throat 31, the divergence portion 32, and the convergence portion 33 are formed at an axial center position inside the upper end member 61.

The first middle member 62 and the second middle member 63 are disk-shaped members having an axial direction parallel to the Z direction. The flow straightening chamber 34 has a downstream part formed at an axial center position inside the first middle member 62. The first middle member 62 is coaxially fixed to overlap the flange 61B of the upper end member 61. The first middle member 62 is positioned with respect to the flange 61B via a positioning portion 65. The flow straightening chamber 34 has a midstream part formed at an axial center position inside the second middle member 63. The second middle member 63 is coaxially fixed to overlap the first middle member 62. The second middle member 63 is positioned with respect to the first middle member 62 via a positioning portion 66.

The bottom member 64 is a member having a circular columnar part 64A having an axial direction parallel to the Z direction, and a disk-shaped flange 64B which is provided at an upstream end portion of the circular columnar part 64A and has an axial direction parallel to the Z direction. The flow straightening chamber 34 has an upstream part and an introduction channel 69 formed at an axial center position inside the bottom member 64. The bottom member 64 is coaxially fixed to overlap the second middle member 63. The bottom member 64 is positioned with respect to the second middle member 63 via a positioning portion 67. The introduction channel 69 is a flow channel in which a gas is introduced in the Z direction into the flow straightening chamber 34 via a valve (not illustrated) such as an electromagnetic valve. The introduction channel 69 extends in the Z direction.

In the supersonic nozzle 3 described above, the gas is introduced into the introduction channel 69 by opening the valve, and the gas flows to the flow straightening chamber 34 and the convergence portion 33 in this order. Then, the gas passes through the throat 31 and the divergence portion 32 to be accelerated from a subsonic speed to a supersonic speed, and the supersonic gas flow G is ejected in the Z direction into the internal space of the vacuum vessel 2.

Figure 3:
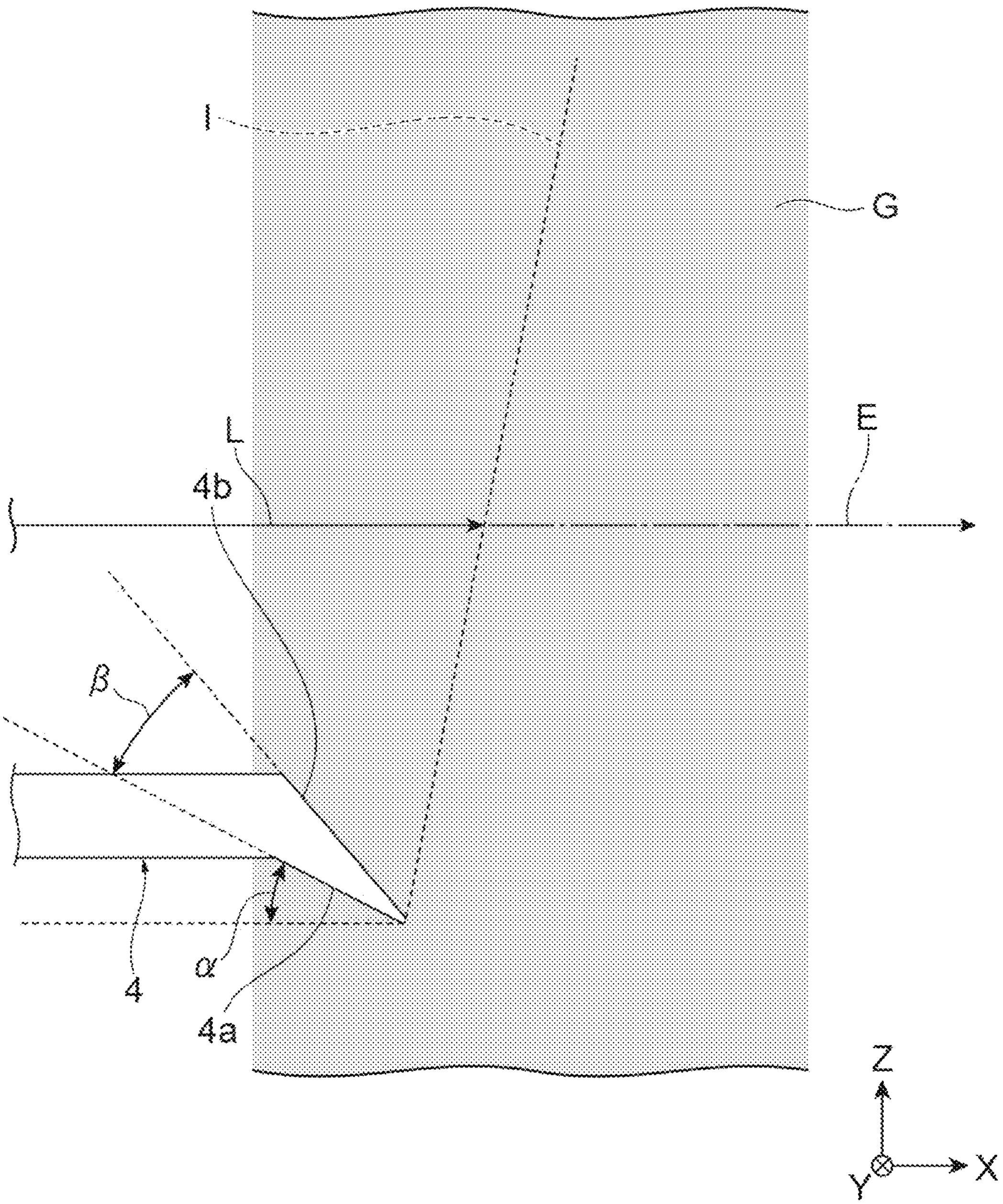
FIG. 3 is an enlarged view of a knife edge in FIG. 1.

As illustrated in FIGS. 1 and 3, the knife edge 4 is inserted into the supersonic gas flow G from one side (left side in the drawing) in the X direction which is a second direction intersecting the first direction. The knife edge 4 is a knife-shaped member and has a sharp pointed tip shape. The knife edge 4 is also referred to as a blade. The knife edge 4 has a tip portion inclined toward the supersonic nozzle 3 with respect to the X direction. The knife edge 4 is fixed to a base 7 via a support member (not illustrated), for example. This allows the knife edge 4 to be supported in a state in which a positional relationship with the supersonic nozzle 3 is maintained constant. For example, the knife edge 4 may be disposed at a distance of 1.5 mm, 2.0 mm, or 2.5 mm away from the supersonic nozzle 3 in the Z direction.

The knife edge 4 forms, in the supersonic gas flow G, a shock wave I starting from the tip portion thereof. The shock wave I has a wavefront from the tip portion of the knife edge 4 toward a side downstream in the supersonic gas flow G and toward the other side in the X direction, for example. Here, the shock wave I is not an arcuate shock wave but a linear oblique shock wave inclined to the other side in the X direction with respect to the Z direction as being away from the supersonic nozzle 3. A steeply falling part of a gas density distribution of the supersonic gas flow G in the X direction corresponds to the shock wave I. Hereinafter, the gas density distribution of the supersonic gas flow G is also simply referred to as a "gas density distribution".

The knife edge 4 is inserted into the supersonic gas flow G from the one side in the X direction, thereby causing the gas density distribution of the supersonic gas flow G in the X direction to become a distribution that rises steeply, falls steeply, and then is maintained within a certain range from the one side toward the other side in the X direction. When viewed from the Y direction, a surface 4*a* of the tip portion of the knife edge 4 on the supersonic nozzle 3 side has an angle $\alpha$ of 30° to 45° with respect to the X direction. When viewed from the Y direction, a tip angle $\beta$ of the tip portion of the knife edge 4 (an angle between the surface 4*a* on the supersonic nozzle 3 side and a surface 4*b* on the opposite side: an angle of a knife edge) is 14° to 28°. In this embodiment, the angle $\alpha$ is 30°, and the tip angle $\beta$ is 14°. The knife edge 4 has a thickness to the extent that a certain level of vibration or higher do not occur in a case where the knife edge 4 is inserted into the supersonic gas flow G. A shape of the knife edge 4 and a positional relationship of the knife edge 4 with the supersonic nozzle 3 are not particularly limited, and may have various shapes and positional relationships as long as the gas density distribution described above is formed.

As illustrated in FIG. 1, the pulsed laser light source 5 radiates the pulsed laser light L in the X direction into the supersonic gas flow G from the one side in the X direction, and propagates the pulsed laser light to pass through the shock wave I in the supersonic gas flow G. The pulsed laser light source 5 radiates the pulsed laser light L in the X direction to pass through a side downstream in the supersonic gas flow G from the knife edge 4 in the supersonic gas flow G. The radiation of the pulsed laser light L causes plasma wave crushing to occur at the shock wave I, and the plasma wave crushing causes the electron beam E having directionality toward the other side in the X direction to be generated.

Next, an electron beam generation method for generating the electron beam E by the above-described electron beam generation apparatus 1 will be described.

First, the valve of the supersonic nozzle 3 is opened from a state of being closed, a gas is supplied at a predetermined pressure from outside to the introduction channel 69 of the supersonic nozzle 3, and the gas flows along the Z direction through the flow straightening chamber 34, the convergence portion 33, the throat 31, and the divergence portion 32. In the supersonic nozzle 3, the gas from outside flows along the Z direction through the flow straightening chamber 34 for a predetermined length, then the gas converges while flowing along the first direction in the convergence portion 33, the flow of the gas is choked in the throat 31, and the gas diverges while flowing along the first direction in the divergence portion 32. This causes the supersonic gas flow G to be ejected along the Z direction into the internal space of the vacuum vessel 2. That is, the supersonic gas flow G flowing along the Z direction under the vacuum atmosphere of the vacuum vessel 2 is generated (a first step).

In the first step, the knife edge 4 is inserted into the supersonic gas flow G from the one side in the X direction. This causes the shock wave I to be formed in the supersonic gas flow G from the tip of the knife edge 4 (a second step).

Subsequently, the pulsed laser light L is radiated from the pulsed laser light source 5 along the X direction into the supersonic gas flow G from the one side in the X direction, and the pulsed laser light L is propagated to pass through the shock wave I in the supersonic gas flow G. This causes a plasma wave to be crushed at a generation position of the shock wave I, that is, a part where the gas density distribution of the supersonic gas flow G in the X direction steeply falls, and the electron beam E is instantaneously generated (a third step). The generated electron beam E travels to the other side in the X direction and is accelerated to have a high energy in an acceleration region (a region where the gas density distribution is maintained within a certain range on the other side in the X direction with respect to the peak in the gas density distribution) in the supersonic gas flow G. Then, the accelerated electron beam E is radiated to the target subject.

Here, as a result of close studies, the present inventors have found that the stability of the electron beam E is significantly affected by the stability of the gas density distribution of the supersonic gas flow G. In addition, the present inventors have found that performance (a parameter) of the electron beam E is sensitive to the gas density distribution of the supersonic gas flow G. Specifically, the present inventors have found that, when the gas density distribution to be formed is unstable, and a positional relationship between a condensing point of the pulsed laser light L and a shock front is unstable, reproducibility and stability of the generated electron beam E are not good.

In this respect, in the electron beam generation apparatus 1 and the electron beam generation method according to this embodiment, the supersonic nozzle 3 has the flow straightening chamber 34. In the supersonic gas flow G generated by the supersonic nozzle 3, the flow straightening chamber 34 enables non-linear instability due to fluid boundary effects to be effectively reduced, enables generation of a turbulent flow (uncertainty in turbulent motion) to be curbed, and enables the stability of the gas density distribution to be enhanced. This enables the stability of the electron beam E to be enhanced. The probability of generation of the electron beam E with respect to a shot (radiation) of the pulsed laser light L can be increased, and reproducibility of an energy spectrum of the electron beam E for each shot of the pulsed laser light L can be increased. Variations in charge or the like of the electron beam E can be curbed.

In the electron beam generation apparatus 1 and the electron beam generation method, the convergence portion 33 and the flow straightening chamber 34 extend along the Z direction, and a predetermined length thereof is 20 mm or longer. In this case, the flow straightening chamber 34 of the supersonic nozzle 3 enables, for example, the generation of a turbulent flow in the supersonic gas flow G generated by the supersonic nozzle 3 to be reliably curbed and enables the stability of the gas density distribution to be reliably enhanced.

In the electron beam generation apparatus 1 and the electron beam generation method, at least the tip portion of the knife edge 4 is inclined toward the supersonic nozzle 3 with respect to the X direction. At least the tip portion of the knife edge 4 is inclined toward the supersonic nozzle 3, thereby enabling the shock wave I linearly extending from the tip of the knife edge 4 to be formed in the supersonic gas flow G. In this case, a generation position of the electron beam E in the supersonic gas flow G can be stabilized, and the stability of the electron beam E can be enhanced. A shape of the shock wave I can be controlled depending on a shape of at least the tip portion of the knife edge 4.

In the electron beam generation apparatus 1 and the electron beam generation method, the supersonic nozzle 3 is configured to be dividable such that the flow straightening chamber 34 is divided. In this case, the flow straightening chamber 34 having a long length can be easily formed.

Figure 4:
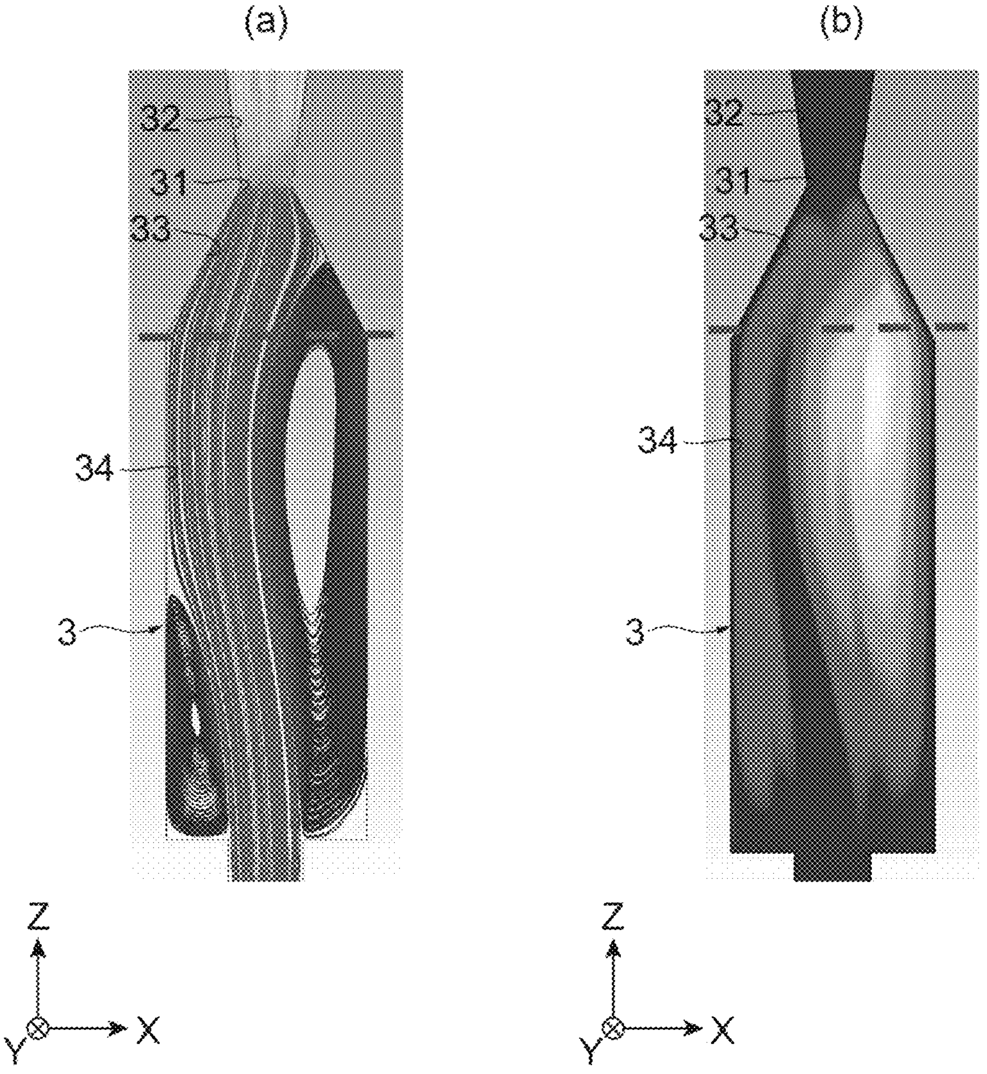
FIG. 4(*a*) is a diagram illustrating gas velocity streamlines inside the supersonic nozzle in a case where a flow straightening chamber has a predetermined length of 10 mm. FIG.

FIG. 4 is a diagram illustrating a flow of a gas inside the supersonic nozzle 3 in a case where the flow straightening chamber 34 has a predetermined length of 10 mm. FIG. 5 is a diagram illustrating a flow of a gas inside the supersonic nozzle 3 in a case where the flow straightening chamber 34 has a predetermined length of 20 mm. FIG. 6 is a diagram illustrating a flow of a gas inside the supersonic nozzle 3 in a case where the flow straightening chamber 34 has a predetermined length of 30 mm. FIGS. 4(*a*), 5(*a*), and 6(*a*) illustrate hydrodynamic simulation results of gas velocity streamlines, and FIG. 4(*b*), 5(*b*), and 6(*b*) illustrate hydrodynamic simulation results of eddy viscosities of the gas.

As illustrated in FIG. 4(*a*), 4(*b*), 5(*a*), 5(*b*), 6(*a*), and 6(*b*), it can be found that the flow straightening chambers 34 having the predetermined lengths of 10 mm, 20 mm, and 30 mm enable the instability of the flow of the gas to be reduced, enables the gas to flow in a laminar flow along the Z direction, and enables the gas in a turbulent flow to be scattered. In this embodiment, it can be found that effects of reducing the instability of a flow of a gas are remarkable when the predetermined length is 20 mm or longer.

FIG. 7(*a*) is a graph illustrating a directional distribution of the electron beams E in a first example. FIG. 7(*b*) is a graph illustrating a directional distribution of the electron beams E in a first comparative example. The first example corresponds to the electron beam generation apparatus 1 according to the first embodiment, and the first comparative example corresponds to an electron beam generation apparatus similar to the first embodiment except that the flow straightening chamber 34 is not provided (the same applies to the followings). In FIGS. 7(*a*) and 7(*b*), the horizontal axis represents the directionality (mrad) in the X direction, and the vertical axis represents the directionality (mrad) in the Y direction. The results in the drawings are obtained by radiating 20 shots of the pulsed laser light L.

According to the first example, as illustrated in FIG. 7(*a*), the directivity of the electron beams E does not vary and is stable, and the stability of the electron beams E can be enhanced. On the other hand, in the first comparative example, as illustrated in FIG. 7(*b*), it can be found that variations in directivity of the electron beams E (for example, a standard deviation of ten times or more) occur, and there is a concern that the stability of the electron beam E will be impaired.

FIG. 8(*a*) is a graph illustrating a density profile of the supersonic gas flow G in the vicinity of an outlet of the supersonic nozzle 3 in the first example. FIG. 8(*b*) is a graph illustrating a density profile of the supersonic gas flow G in the vicinity of an outlet of a supersonic nozzle in the first comparative example. In FIGS. 8(*a*) and 8(*b*), the horizontal axis represents a position (mm) in the X direction, and the vertical axis represents a gas density ($n/10^{18}$ $cm^{-3}$). Differences in line type in both the drawings indicate differences in height from a front surface of the supersonic nozzle 3.

According to the first example, as illustrated in FIG. 8(*a*), the density profiles are symmetrical in the X direction, and peaks of the density profiles are gentle (a range in the X direction in which a gas density is high is wide). According to the first example, it can be found that the density profiles tend to be the same and stable even in a case where heights from the front surface of the supersonic nozzle 3 are different. On the other hand, in the first comparative example, as illustrated in FIG. 8(*b*), the density profile is asymmetric in the *X* direction, and the peak of the density profile is also relatively sharp. In the first comparative example, it can be found that, in a case where the heights from the front surface of the supersonic nozzle 3 are different, the density profiles may tend to be different, and there is a concern that the density profiles will become unstable.

FIG. 9(*a*) is a graph illustrating density profiles of the shock waves I in the first example. FIG. 9(*b*) is a graph illustrating density profiles of shock waves in the first comparative example. In FIGS. 9(*a*) and 9(*b*), the horizontal axis represents a position (mm) in the X direction, and the vertical axis represents a relative value (n/n0) of a gas density. Differences in line type in both the drawings indicate perturbations in nozzle outlets with respect to a pressure of the gas supplied to the supersonic nozzle 3.

According to the first example, as illustrated in FIG. 9(*a*), even when the perturbations in the nozzle outlets with respect to the pressure of the gas supplied to the supersonic nozzle 3 are different, the density profiles do not vary and are stable, and a distribution deviation is almost 0. On the other hand, in the first comparative example, as illustrated in FIG. 9(*b*), it can be found that, in a case where the perturbations in the nozzle outlets with respect to the pressure of the gas supplied to the supersonic nozzle 3 are different, the density profiles may vary, and there is a concern that the distribution deviation will be, for example, 30 μm or more.

FIG. 10(*a*) is a diagram illustrating a density distribution of the supersonic gas flow G in the first example. FIG. 10(*b*) is a diagram illustrating a density distribution of the supersonic gas flow G in a second comparative example. FIGS. 10(*a*) and 10(*b*) illustrate hydrodynamic simulation results. In FIGS. 10(*a*) and 10(*b*), the density distributions of the supersonic gas flow G are visualized by shading of a color. The second comparative example corresponds to an electron beam generation apparatus similar to that of the first embodiment except that an entire knife edge 4J (including a tip portion) extending in the X direction is provided instead of the knife edge 4.

According to the first example, as illustrated in FIG. 10(*a*), the shock wave I is not an arcuate shock wave but an oblique shock wave linearly extending from the tip of the knife edge 4. In this case, the gas can be prevented from remaining (stagnating) in a region formed by the shock wave I and the tip portion of the knife edge 4, and the position of the shock wave I can be prevented from becoming unstable due to an effect of the remaining. As a result, the position of the shock wave I becomes more stable, and the parameter (pointing, an energy spectrum, a charge amount, or the like) of the electron beam E can be stabilized. On the other hand, in the second comparative example, as illustrated in FIG. 10(*b*), the shock wave I is an arcuate shock wave. In this case, it can be found that a gas may remain in the region formed by the shock wave I and the tip portion of the knife edge 4, and there is a concern that position of the shock wave I will become unstable.

FIG. 11 is a graph illustrating density profiles of shock waves I in the first example and the second comparative example. In FIG. 11, the horizontal axis represents a position (mm) in the X direction, and the vertical axis represents a relative value (n/n0) of a gas density. As illustrated in FIG. 11, it can be found that, in the first example, a height of a peak in a gas density distribution of the supersonic gas flow G can be increased as compared with the second comparative example, and the shock wave I becomes sharp. That is, in the electron beam generation apparatus 1, the strong shock wave I can be stably formed in the supersonic gas flow G.

Second Embodiment

Next, a second embodiment will be described. In the description of this embodiment, differences from the first embodiment will be described, and redundant descriptions will be omitted.

An electron beam generation apparatus according to the second embodiment differs from that of the first embodiment in that a supersonic nozzle 103 having a mesh member (flow straightening member) 8 is provided as illustrated in FIG. 12 instead of the supersonic nozzle 3 (see FIG. 2).

The mesh member 8 is provided inside the flow straightening chamber 34. In the mesh member 8, a plurality of fine holes are formed along the Z direction which is a flow direction of the flow straightening chamber 34. The mesh member 8 is disposed inside the flow straightening chamber 34 at a distance of 5 mm or longer from an upstream end and a downstream end of the flow straightening chamber 34. In the illustrated example, the mesh member 8 is provided inside the flow straightening chamber 34 to be sandwiched between the second middle member 63 and the circular columnar part 64A of the bottom member 64.

As illustrated in FIG. 13, the mesh member 8 has a knitting structure in which linear members having a circular cross section are arranged in the X direction and the Y direction at predetermined intervals. A diameter of a cross section of the mesh member 8 is, for example, 0.1 mm, and the predetermined interval is, for example, 0.2 mm. The mesh member 8 is made of, for example, stainless steel. The mesh member 8 may be made of a material having a certain level of hardness or higher instead of stainless steel.

The electron beam generation apparatus and an electron beam generation method according to the second embodiment are also capable of enhancing the stability of the electron beam E. In addition, a flow rectification of the mesh member 8 enables, for example, the generation of a turbulent flow in the supersonic gas flow G to be further curbed and enables the stability of the gas density distribution to be further enhanced. Since the mesh member 8 has a net structure, a pressure difference generated between sides upstream and downstream of the mesh member 8 can be reduced while a sufficient flow rectification is ensured.

In the electron beam generation apparatus and the electron beam generation method according to the second embodiment, the mesh member 8 is disposed inside the flow straightening chamber 34 at a distance of 5 mm or longer from the upstream end or the downstream end of the flow straightening chamber 34. In this case, since the mesh member 8 is sufficiently separated from the upstream end or the downstream end of the flow straightening chamber 34, the flow rectification of the mesh member 8 can be prevented from being insufficiently exerted due to an effect of the upstream end or the downstream end of the flow straightening chamber 34, and the flow rectification of the mesh member 8 can be reliably exhibited.

FIG. 14(*a*) is a diagram illustrating a density distribution of a gas inside a supersonic nozzle 3 in a second example. FIG. 14(*b*) is a diagram illustrating the density distribution of the gas inside the supersonic nozzle 3 in the first example. The second example corresponds to the electron beam generation apparatus according to the second embodiment. FIGS. 14(*a*) and 14(*b*) illustrate hydrodynamic simulation results. In FIGS. 14(*a*) and 14(*b*), the density distributions of the gas are visualized by shading of a color. As illustrated in FIGS. 14 (*a*) and 14 (*b*), it can be found that the flow of the gas can be further straightened inside the flow straightening chamber 34 by the mesh member 8.

In the second embodiment, the flow straightening chamber 34 may have a predetermined length of 10 mm or longer. Also in this case, the flow straightening chamber 34 enables, for example, the generation of a turbulent flow in the supersonic gas flow G generated by the supersonic nozzle 3 to be reliably curbed and enables the stability of the gas density distribution of the supersonic gas flow G to be reliably enhanced.

Third Embodiment

As illustrated in FIG. 15, an electron beam generation apparatus 201 is an apparatus that generates an electron beam E for being radiated to a target subject. The target subject is not particularly limited, and examples thereof include a prodrug in a patient's body. In this case, the electron beam E acts as a trigger for changing the prodrug in the patient's body into an active substance. The prodrug is not particularly limited, and examples thereof include a prodrug that passes through the blood-brain barrier (a mechanism that restricts transit of a substance from blood to brain tissue).

The electron beam E generated by the electron beam generation apparatus 201 may have an energy higher than 1 MeV, an energy higher than 10 MeV, or an energy higher than 200 MeV. In a case where the target subject is a patient, the electron beam E may have an energy higher than 10 MeV. The electron beam generation apparatus 201 according to this embodiment generates the electron beam E by propagating pulsed laser light L in a supersonic gas flow G. The electron beam generation apparatus 201 includes a vacuum vessel 202, a supersonic nozzle 203, a knife edge 204, a pulsed laser light source (radiation unit) 205, and a back plate (plate member) 206.

The vacuum vessel 202 is a vessel having a vacuum internal space. The supersonic nozzle 203 is a nozzle that ejects, into an internal space of the vacuum vessel 202, the supersonic gas flow G toward the Z direction which is a first direction. That is, the supersonic nozzle 203 generates the supersonic gas flow G flowing along the Z direction under a vacuum atmosphere. The supersonic gas flow G is a flow of a gas (a gas flow) flowing at supersonic speed. For example, hydrogen gas can be used as the supersonic gas flow G. For example, as the supersonic nozzle 203, an axially asymmetric Laval nozzle can be used.

As illustrated in FIGS. 15 and 16, the supersonic nozzle 203 has a nozzle body 231 fixed on a base 207. The nozzle body 231 includes a throat 232 that chokes a flow of a flowing gas, a gas flow channel 233 in which the gas flows from the outside to the throat 232, and an opening 234 forming an outlet of the supersonic gas flow G. The throat 232 is a part having the smallest flow channel cross-sectional area in the supersonic nozzle 203. The gas flow channel 233 includes two bent portions 235 that bend, toward the X direction which is the second direction, the flow of the gas flowing along the Z direction. Specifically, the gas flow channel 233 includes, as the bent portions 235, a first bent portion 235A provided on a side upstream of the gas flow channel 233 and a second bent portion 235B provided on a side downstream of the gas flow channel 233.

The gas flow channel 233 includes an introduction channel 233A, a first chicane channel 233B, a middle channel 233C, and a second chicane channel 233D in this order from the side upstream to the side downstream therein. The introduction channel 233A is a flow channel that allows the gas to be introduced into the nozzle body 231 via a valve 208 such as an electromagnetic valve. The introduction channel 233A extends along the Z direction. The first chicane channel 233B is a flow channel that communicates with a downstream side of the introduction channel 233A via the first bent portion 235A. The first chicane channel 233B extends along the X direction. The middle channel 233C communicates with a downstream side of the first chicane channel 233B. The middle channel 233C extends along the Z direction. The second chicane channel 233D communicates with a downstream side of the middle channel 233C via the second bent portion 235B. The second chicane channel 233D extends along the X direction. A midstream part of the second chicane channel 233D communicates with the throat 232. A buffer portion 233Q is provided at a downstream end portion of the second chicane channel 233D. The opening 234 is a U-shaped cutout when viewed from the Y direction. The opening 234 communicates with the throat 232.

In the supersonic nozzle 203, when the valve 208 is opened, the gas is introduced into the introduction channel 233A of the gas flow channel 233, and the gas flows through the first chicane channel 233B, the middle channel 233C, and the second chicane channel 233D in this order. Then, the gas reaching the second chicane channel 233D passes through the throat 232 to be accelerated from a subsonic speed to a supersonic speed, and the supersonic gas flow G is ejected along the Z direction from the opening 234 into an internal space of the vacuum vessel 202.

The knife edge 204 is inserted into the supersonic gas flow G from one side in the X direction (a left side in the drawing). The knife edge 204 is a knife-shaped member having a long length in the X direction and has a sharp pointed tip shape. The knife edge 204 forms, in the supersonic gas flow G, a shock wave I starting from the tip portion thereof. The shock wave I has a wavefront from the tip portion of the knife edge 204 toward a side downstream in the supersonic gas flow G and toward the other side in the X direction, for example. The knife edge 204 is fixed to the base 207 via a support member (not illustrated), for example. This allows the knife edge 204 to be supported in a state in which a positional relationship with the supersonic nozzle 203 is maintained constant.

As described in FIGS. 15 and 21, the knife edge 204 described above is inserted into the supersonic gas flow G from the one side in the X direction, thereby causing the gas density distribution of the supersonic gas flow G in the X direction to become a distribution that rises steeply, falls steeply, and then is maintained within a certain range from the one side toward the other side in the X direction. A shape of the knife edge 204 and a positional relationship of the knife edge 204 with the supersonic nozzle 203 are not particularly limited, and may have various shapes and positional relationships as long as the gas density distribution described above is formed.

A part D in which the gas density distribution in the X direction steeply falls corresponds to the shock wave I. A position at which the gas density distribution in the X direction steeply rises and steeply falls is a peak, and a region (flat region) where the gas density distribution is maintained within a certain range on the other side in the X direction from the peak is an acceleration region AC. In the acceleration region AC, the generated electron beam E can be accelerated. The part D in which the gas density distribution steeply falls is also referred to as a shock front.

The pulsed laser light source 205 radiates the pulsed laser light L along the X direction into the supersonic gas flow G from the one side in the X direction, and propagates the pulsed laser light to pass through the shock wave I in the supersonic gas flow G. The pulsed laser light source 205 radiates the pulsed laser light L along the X direction to pass through a side downstream in the supersonic gas flow G from the knife edge 204 in the supersonic gas flow G. As illustrated in FIGS. 15 and 19, the radiation of the pulsed laser light L described above causes plasma wave crushing to occur at the shock wave I, and the plasma wave crushing causes the electron beam E having directionality toward the other side in the X direction to be generated.

As illustrated in FIGS. 15, 17, and 19, the back plate 206 is a flat plate-shaped member that is elongated in the Z direction and has a thickness direction parallel to the X direction. For example, the back plate 206 is made of stainless steel and has a thickness of 2 mm. The back plate 206 is disposed by the other side of the supersonic nozzle 203 in the X direction (the right side in the drawing). In this embodiment, a base end side of the back plate 206 is fixed to the supersonic nozzle 203 on the other side in the X direction with a screw or the like. The back plate 206 is also referred to as a rear plate.

The back plate 206 extends along a boundary plane GB of the supersonic gas flow G on the other side in the X direction. The back plate 206 is disposed without a gap with respect to the supersonic nozzle 203 in the X direction. A surface of the back plate 206 on the supersonic gas flow G side is a flat surface. The back plate 206 projects in the Z direction from the supersonic nozzle 203 beyond a condensing point LS of the pulsed laser light L. A through-hole 206*x* having a circular cross section is formed to penetrate a tip portion (an end portion on a side away from the supersonic nozzle 203) of the back plate 206 along the X direction. The through-hole 206*x* is a hole through which the generated electron beam E passes. The back plate 206 is positioned on the other side in the X direction with respect to the condensing point LS of the pulsed laser light L. In other words, the condensing point LS of the pulsed laser light L is positioned on the one side in the X direction with respect to the back plate 206. An end of the back plate 206 and a side edge of the through-hole 206*x* are chamfered, and the end of the back plate 206 and the side edge of the through-hole 206*x* are rounded.

Next, the electron beam generation method for generating the electron beam E by the above-described electron beam generation apparatus 201 will be described with reference to FIGS. 18 to 21.

FIGS. 18, 19, and 20 are diagrams illustrating respective states in the supersonic gas flow G for description of the electron beam generation method. FIG. 21 is a graph illustrating a gas density distribution of the supersonic gas flow G in the X direction. In FIGS. 18, 19, and 20, the flow of the supersonic gas flow G is visualized by, for example, the Schlieren method. FIGS. 18, 19, and 20 illustrate respective states obtained by viewing the periphery of the supersonic nozzle 203 from the Y direction. In these drawings, the formed shock wave I may be represented by a broken line for convenience of display. In FIG. 21, the horizontal axis represents a position in the X direction, and the vertical axis represents a gas density. A range from a position X1 to a position X2 in the X direction corresponds to a range in the X direction in which the supersonic nozzle 203 is provided (the same applies to FIGS. 23 and 24 to be described below).

First, the valve 208 of the supersonic nozzle 203 is opened from a closed state, and the gas flows from the outside to the throat 232 along the gas flow channel 233 in the supersonic nozzle 203. When the gas flows to the throat 232, the supersonic nozzle 203 causes the flow of the gas to be bent at least once toward the X direction by the first chicane channel 233B and the second chicane channel 233D. As illustrated in FIG. 18, the supersonic gas flow G is ejected along the Z direction from the supersonic nozzle 203 into the internal space of the vacuum vessel 202 (under a vacuum atmosphere). This causes the supersonic gas flow G flowing along the Z direction to be generated in the internal space of the vacuum vessel 202 (the first step). At this time, the knife edge 204 is inserted into the supersonic gas flow G from the one side in the X direction. This causes the shock wave I to be formed in the supersonic gas flow G from the tip of the knife edge 204 (the second step). In the second step, the back plate 206 is disposed on the other side of the supersonic nozzle 203 in the X direction, and the back plate 206 extends along the boundary plane GB of the supersonic gas flow G.

Subsequently, as illustrated in FIG. 19, the pulsed laser light L is radiated from the pulsed laser light source 205 along the X direction into the supersonic gas flow G from the one side in the X direction, and the pulsed laser light L is propagated to pass through the shock wave I in the supersonic gas flow G. As illustrated in FIGS. 20 and 21, this causes a plasma wave to be crushed at a generation position of the shock wave I, that is, a part D where the gas density distribution of the supersonic gas flow G in the X direction steeply falls, and the electron beam E is instantaneously generated (the third step). The generated electron beam E travels to the other side in the X direction and is accelerated to have a high energy in a region until the electron beam E passes through the through-hole 206*x* of the back plate 206, that is, the acceleration region AC in the supersonic gas flow G. Then, the accelerated electron beam E passes through the through-hole 206*x* of the back plate 206 and then is radiated to a target subject (not illustrated).

Here, as a result of close studies, the present inventors have found that the stability of the electron beam E is significantly affected by the stability of the gas density distribution of the supersonic gas flow G. In addition, the present inventors have found that performance (a parameter) of the electron beam E is sensitive to the gas density distribution of the supersonic gas flow G. Specifically, it has been found that, when the gas density distribution to be formed is unstable, and the positional relationship between the condensing point LS of the pulsed laser light L and the shock front is unstable, the reproducibility and stability of the generated electron beam E are not good. In addition, it has been found that position stability of a peak of a density is not good in a case where the peak of the gas density distribution is small (the shock wave I is weak) and in a case where the shock front has a gentle gradient.

In this respect, in the electron beam generation apparatus 201 and the electron beam generation method according to this embodiment, the back plate 206 having the through-hole 206*x* enables spreading of the supersonic gas flow G ejected from the supersonic nozzle 203 to a side opposite to the side on which the knife edge 204 is inserted (the other side in the X direction) to be curbed without interference with the generated electron beam E. This enables a strong shock wave I to be stably formed in the supersonic gas flow G. The peak of the gas density distribution can be increased, and the shock front can have a steep gradient. Improvement of ten times or more in the position stability of the peak in the gas density distribution can be achieved, for example. A constant positional relationship between the condensing point LS of the pulsed laser light L and the shock front can be maintained constant. As a result, the stability of the gas density distribution can be enhanced, and the stability and the reproducibility of the electron beam E can be enhanced. The probability of generation of the electron beam E with respect to the shot (radiation) of the pulsed laser light L can be increased, and the reproducibility of an energy spectrum of the electron beam E for each shot of the pulsed laser light L can be increased. Variations in charge or the like of the electron beam E can be curbed.

In order to enhance the stability and the reproducibility of the electron beam E, the gas density distribution of the supersonic gas flow G generated by the supersonic nozzle 203 is desirably uniform in the X direction which is a propagation direction of the pulsed laser light L in a state in which the knife edge 204 is not inserted. However, when the gas directly flows from the outside of the supersonic nozzle 203 to the throat 232, a flow velocity of the gas in a central portion in the X direction becomes faster and a density thereof becomes smaller in the generated supersonic gas flow G, and there is a possibility that the gas density distribution will not be uniform in the X direction.

In this regard, in the electron beam generation apparatus 201, a gas loading structure in the gas flow channel 233 which is a reservoir unit (reservoir tank) of the supersonic nozzle 203 is improved. That is, in the electron beam generation apparatus 201, the gas flow channel 233 through which the gas flows from the outside to the throat 232 in the supersonic nozzle 203 has at least one bent portion 235 at which the flow of the gas is bent toward the X direction. In the electron beam generation method, in a step of allow the gas to flow from the outside to the throat 232 of the supersonic nozzle 203, the flow of the gas in the supersonic nozzle 203 is bent at least once toward the X direction. This enables the gas from the outside of the supersonic nozzle 203 to be prevented from flowing directly to the throat 232, enables the flow velocity of the gas flowing to the throat 232 to be decreased, and enables the momentum of the gas in the throat 232 to approach zero. As a result, the gas density distribution can be made uniform in the X direction.

In the electron beam generation apparatus 201, the gas flow channel 233 includes, as the bent portions 235, the first bent portion 235A provided on a side upstream of the gas flow channel 233 and the second bent portion 235B provided on a side downstream of the gas flow channel 233. In this case, the flow velocity of the gas flowing through the throat 232 can be effectively decreased, and the gas density distribution can be effectively made uniform in the X direction.

In the electron beam generation apparatus 201, the knife edge 204 causes the gas density distribution of the supersonic gas flow G in the X direction to become a distribution that rises steeply, falls steeply, and then is maintained within a certain range from the one side toward the other side in the X direction. In this case, the insertion of the knife edge 204 into the supersonic gas flow G from the one side in the X direction enables the gas density distribution of the supersonic gas flow G which is suitable for generating the electron beam E to be formed.

The electron beam generation apparatus 201 causes the plasma wave crushing to occur at the shock wave I in the supersonic gas flow G by the pulsed laser light L, and generates the electron beam E by the plasma wave crushing. As described above, in the electron beam generation apparatus 201, the electron beam E can be generated using the plasma wave crushing.

The electron beam generation apparatus 201 accelerates the generated electron beam E in the acceleration region AC in which the gas density distribution of the supersonic gas flow G in the X direction is maintained within the certain range. In this case, the generated electron beam can be accelerated to have the high energy by using the acceleration region AC having a size of about several centimeters.

In the electron beam generation apparatus 201, the condensing point LS of the pulsed laser light L is positioned on the one side in the X direction from the back plate 206. In this case, adverse effects of the condensing of the pulsed laser light L on the back plate 206 can be curbed. In the electron beam generation apparatus 201, the pulsed laser light source 205 radiates the pulsed laser light L along the X direction into the supersonic gas flow G from the one side in the X direction. The through-hole 206*x* penetrates the back plate in the X direction. In this case, the pulsed laser light source 205 and the through-hole 206*x* can be specifically formed.

FIGS. 22(*a*) and 22(*b*) are graphs illustrating variations in position of the shock front when the electron beam E is repeatedly generated. FIG. 22(*a*) illustrates data according to a third comparative example, and FIG. 22(*b*) illustrates data according to a third example which is the electron beam generation apparatus 201. The third comparative example differs from the electron beam generation apparatus 201 in that the back plate 206 is not provided, and a supersonic nozzle through which a gas directly flows to the throat 232 without the bent portion 235 is provided instead of the supersonic nozzle 203. Except for that, the third comparative example has the same configuration as that of the electron beam generation apparatus 201. In FIGS. 22(*a*) and 22(*b*), the vertical axis represents a relative value of a gas density of the supersonic gas flow G, and the horizontal axis represents a position in the X direction. Both waveforms in FIGS. 22(*a*) and 22(*b*) correspond to results when the electron beam E is repeatedly generated.

As illustrated in FIG. 22(*a*), in the case of the comparative example, the position of the shock front in the X direction varies in a range of 60 μm, for example. On the other hand, as illustrated in FIG. 22(*b*), in the electron beam generation apparatus 201 including the back plate 206, variations in the position of the shock front in the X direction can be curbed, and the variations can converge within a range of 25 μm, for example. This can confirm that the position stability of the peak of the gas density distribution can be improved in the electron beam generation apparatus 201.

FIGS. 23(*a*) and 23(*b*) are graphs illustrating the gas density distribution of the supersonic gas flow G in the X direction. FIG. 23(*a*) illustrates data according to the third comparative example, and FIG. 23(*b*) illustrates data according to the third example which is the electron beam generation apparatus 201. In FIGS. 23(*a*) and 23(*b*), the vertical axis represents a gas density of the supersonic gas flow G, and the horizontal axis represents a position in the X direction. As illustrated in FIGS. 23(*a*) and 23(*b*), it can be found that, in the electron beam generation apparatus 201, a height of a peak (a shock wave) in the gas density distribution of the supersonic gas flow G can be increased as compared with the third comparative example. This can confirm that, in the electron beam generation apparatus 201, the strong shock wave I is stably formed in the supersonic gas flow G, and the position stability of the peak in the gas density distribution can be improved.

FIGS. 24(*a*) and 24(*b*) are exemplary graphs illustrating the gas density distributions of the supersonic gas flow G in the X direction in a state before the knife edge 204 is inserted. FIG. 24(*a*) illustrates data according to a third comparative example, and FIG. 24(*b*) illustrates data according to the third example which is the electron beam generation apparatus 201. In FIGS. 24(*a*) and 24(*b*), the vertical axis represents a gas density of the supersonic gas flow G, and the horizontal axis represents a position in the X direction.

As illustrated in FIG. 24(*a*), in the third comparative example, the gas density distribution of the supersonic gas flow G in the X direction is not uniform and has a waveform recessed at a central portion thereof. On the other hand, as illustrated in FIG. 24(*b*), in the electron beam generation apparatus 201, it has been confirmed that the gas density distribution of the supersonic gas flow G in the X direction can be made uniform.

The electron beam generation apparatus 201 includes the buffer portion 233Q. The buffer portion 233Q further prevents the gas from flowing directly to the throat 232, and the gas density distribution of the supersonic gas flow G can be made more uniform in the X direction. In the electron beam generation apparatus 201, chamfering is performed on the end of the back plate 206 and the side edge of the through-hole 206*x*, thereby enabling the generation of shock waves due to burrs to be curbed.

In the electron beam generation apparatus 201, the back plate 206 may have a certain thickness or more and certain strength or higher so as not to vibrate when the supersonic gas flow G ejected from the supersonic nozzle 203 is curbed. A surface of the back plate 206 on the supersonic gas flow G side may be a curved surface.

The knife edge 204 of this embodiment may be configured to be able to adjust an insertion length that is a length of the knife edge 204 which is inserted into the supersonic gas flow G. Alternatively or additionally, the knife edge 204 of this embodiment may be configured to be able to adjust the insertion angle thereof. As an example of a configuration by which the knife edge 204 is realized, as illustrated in FIG. 25, the electron beam generation apparatus 201 may include a knife edge slide mechanism 242 and an insertion angle adjusting mechanism 244. The insertion length is also referred to as an insertion depth. The insertion angle is also referred to as an inclination amount (inclination degree). The insertion angle is an angle between an extending direction (longitudinal direction) of the knife edge 204 and the X direction in a state in which the knife edge 204 is inserted into the supersonic gas flow G.

The knife edge slide mechanism 242 is a mechanism that can change a length of the knife edge 204 inserted into the supersonic gas flow G. The knife edge slide mechanism 242 is not particularly limited, and various known mechanisms can be employed. Examples of the knife edge slide mechanism 242 include a mechanism that fixes, to a post, a rod having a tip to which a clamp holding the knife edge 204 is fixed, such that the rod is slidable in a longitudinal direction of the rod. The insertion angle adjusting mechanism 244 is a mechanism that can change the insertion angle of the knife edge 204. The insertion angle adjusting mechanism 244 is not particularly limited, and various known mechanisms can be employed. Examples of the insertion angle adjusting mechanism 244 include a mechanism that fixes, to the post, a base end side of the rod having a tip to which the clamp holding the knife edge 204 is fixed, such that the rod can be rotatable about a rotation axis along the Y direction.

FIG. 26 is a graph illustrating a gas density distribution of the supersonic gas flow G in the X direction in a case where the insertion length is changed. In the drawing, a waveform Q1 indicates data in a case where the insertion length is set to a first value (for example, 0.5 mm). A waveform Q2 indicates data in a case where the insertion length is set to a second value (for example, 1.0 mm) larger than the first value. A waveform Q3 indicates data in a case where the insertion length is set to a third value (for example, 1.5 mm) larger than the second value. A waveform Q4 indicates data in a case where the insertion length is set to a fourth value (for example, 2.0 mm) larger than the third value. A waveform Q5 indicates data in a case where the insertion length is set to a fifth value (for example, 3.0 mm) larger than the fourth value.

As illustrated in FIG. 26, it can be found that a change in the insertion length enables a magnitude and a position of a peak in the gas density distribution to be changed. This enables a length of the acceleration region AC (see FIG. 21) in which the gas density distribution is maintained within a certain range immediately after a peak thereof to be adjusted as desired. Since the generated electron beam E can be accelerated in the acceleration region AC, a change in the insertion length enables an acceleration energy of the electron beam E to be adjusted as desired.

FIGS. 27(*a*) and 27(*b*) are graphs illustrating gas density distributions of the supersonic gas flow G in the X direction in a case where the insertion angle is changed. FIG. 27(*a*) illustrates data in a case where the insertion angle is 0° (in a case where the extending direction of the knife edge 204 is the X direction). FIG. 27(*b*) illustrates data in a case where the insertion angle is α (in a case where the extending direction of the knife edge 204 is inclined with respect to the X direction). Here, a is not particularly limited, and is, for example, an angle of 36° or smaller.

As illustrated in FIG. 27, it can be found that a change in the insertion angle enables the inclination of the shock wave I formed in the supersonic gas flow G to be changed, thus enabling the inclination of the shock front in the gas density distribution to be changed. For example, it can be found that, when the insertion angle is set to α, the inclination of the shock front in the gas density distribution can be increased as compared with the case where the insertion angle is 0°. It can be found that a width H0 of the shock front in the X direction is, for example, 300 μm or smaller in the case where the insertion angle is 0°, whereas the width can be 140 μm or smaller in the case where the insertion angle is α. As a result, parameters (a charge amount, a probability of generation, and the like) of the electron beam E which is to be generated can be adjusted as desired.

FIG. 28 is a graph illustrating an experimental result of fluctuations in position of the shock wave I in the X direction in a fourth example and a fifth example. The fourth example corresponds to the electron beam generation apparatus according to the second embodiment including the mesh member 8. The fifth embodiment corresponds to an electron beam generation apparatus similar to that of the second embodiment except that the mesh member 8 is not provided. The horizontal axis in FIG. 28 indicates fluctuations (μm) in position of the shock wave I in the X direction, and 0 is an average value (statistical average) in a case where 20 consecutive shots of the pulsed laser light L are radiated. The vertical axis in FIG. 28 represents a percentage (%) at which the fluctuations can occur in the case where 20 consecutive shots of the pulsed laser light L are radiated.

As illustrated in FIG. 28, in the fourth example, it can be found that, regarding fluctuations in position of the shock wave I in the X direction, 45% (nine shots) of the consecutive 20 shots are not moved from a position of 0 μm, and a moving range is also a range of −2 to 4 μm. According to these experimental results, as can be found from the comparison between the fourth example and the fifth example, the stability of the position of the shock front of the shock wave I depending on the presence or absence of the mesh member 8 (high reproducibility of a position of a shock wave surface) can be confirmed.

FIG. 29 is a graph illustrating an experimental result of fluctuations in position of the shock wave I in the X direction in a sixth example and a seventh example. The horizontal axis and the vertical axis in FIG. 29 are the same as the horizontal axis and the vertical axis in FIG. 28. The sixth example corresponds to the electron beam generation apparatus 1 according to the first embodiment having the knife edge 4 having at least the tip portion that is inclined toward the supersonic nozzle 3 with respect to the X direction. The seventh example corresponds to an electron beam generation apparatus similar to that of the first embodiment except that the knife edge 204 extending in the X direction (not inclined) is provided.

As illustrated in FIG. 28, in the sixth example, it can be found that, regarding fluctuations in position of the shock wave I in the X direction, about 70% (14 shots) of the consecutive 20 shots are not moved from the position of 0 μm, and a moving range is also a range of −1 to 2 μm. In the seventh example, it can be found that, regarding fluctuations in position of the shock wave I in the X direction, about 40% (eight shots) of the consecutive 20 shots are not moved from the position of 0 μm, and a moving range is also a range of −2 to 4 μm. According to these experimental results, as can be found from the comparison between the sixth example and the seventh example, the stability of the position of the shock front of the shock wave I depending on each of the knife edges 4 and 204 can be confirmed. In addition, it has been confirmed that the position of the shock front of the shock wave I is particularly stable at the knife edge 4.

Although the embodiments have been described above, one aspect of the present invention is not limited to the above-described embodiments.

In the first embodiment and the second embodiment, the predetermined length of the flow straightening chamber 34 is not particularly limited. The predetermined length of the flow straightening chamber 34 may be a length larger than a size of an eddy that may be generated inside the supersonic nozzle 3. In the first embodiment and the second embodiment, the supersonic nozzle 3 is configured to be dividable such that the flow straightening chamber 34 is divided into three portions, but may be configured to be dividable such that the flow straightening chamber is divided into two or four or more portions. Alternatively, the supersonic nozzle 3 may not be configured to be dividable.

In the first embodiment and the second embodiment, the flow straightening chamber 34 has the constant flow channel cross-sectional area in the Z direction. However, the flow straightening chamber 34 may include a portion having a flow channel cross-sectional area which is increased or decreased from one end to the other end thereof in the Z direction, or may include a portion having a flow channel cross-sectional area which is locally large or small. In the first embodiment and the second embodiment, the tip portion of the knife edge 4 is inclined toward the supersonic nozzle 3 with reference to the X direction, but the entire knife edge 4 may be inclined or may not be inclined.

In the second embodiment, the mesh member 8 is provided as the flow straightening member, but the flow straightening member is not limited to the mesh-shaped member, and may be another member as long as the member has a plurality of fine holes formed in the flowing direction of the flow straightening chamber 34. For example, the flow straightening member is not limited to the member having the net structure, and may be a plate in which a plurality of fine holes are formed.

In the second embodiment, one mesh member 8 is provided between the second middle member 63 and the bottom member 64, but the number and positions of the mesh members 8 are not particularly limited. For example, instead of or in addition to the mesh member 8 between the second middle member 63 and the bottom member 64, another mesh member 8 may be provided between the first middle member 62 and the second middle member 63.

In the first embodiment and the second embodiment, the first step and the second step may be executed simultaneously. In the embodiments, the pulsed laser light L is radiated along the X direction into the supersonic gas flow G from the one side in the X direction, but not limited to these embodiments. For example, the radiation unit may be configured to be able to adjust at least any one of a radiation direction, a radiation position, a position of the condensing point, and an optical axis (optical path) of the pulsed laser light L. For example, the pulsed laser light source 5 may be capable of changing the radiation position of the pulsed laser light L in the Z direction.

In the third embodiment described above, the gas flow channel 233 of the supersonic nozzle 203 has two bent portions 235, but the number of bent portions 235 of the supersonic nozzle 203 may be one or three or more. In the third embodiment, the gas flow is bent from the Z direction toward the X direction by the bent portion 235, but not limited to the embodiment, and the bent portion 235 may bend the gas flow toward a direction intersecting the Z direction.

In the third embodiment, the through-hole 206*x* of the back plate 206 is provided along the X direction, but not limited to the embodiment, and the through-hole 206*x* may penetrate the back plate 206 along the propagation direction of the electron beam E. In the third embodiment, the first step and the second step may be executed simultaneously or in any order.

In the third embodiment, the pulsed laser light L is radiated along the X direction into the supersonic gas flow G from the one side in the X direction, but not limited to the embodiment. For example, the radiation unit may be configured to be able to adjust at least any one of a radiation direction, a radiation position, a position of the condensing point LS, and an optical axis (optical path) of the pulsed laser light L. In this case, the through-hole 206*x* of the back plate 206 may have a size and/or a shape that can correspond to the corresponding adjustment. For example, the pulsed laser light source 205 may be capable of changing the radiation position of the pulsed laser light L in the Z direction, and in this case, the through-hole 206*x* may be a long hole elongated in the Z direction. At this time, in order to reduce leakage of the supersonic gas flow G from the through-hole 206*x*, a blocking portion (for example, a tape material or a plate material) capable of blocking a desired partial region in the through-hole 206*x* may be provided.

The third embodiment described above includes both the supersonic nozzle 203 and the back plate 206, but in the case where the supersonic nozzle 203 is provided, the back plate 206 may not be provided. In addition, in the third embodiment described above, in the case where the back plate 206 is provided, and a supersonic nozzle including a gas channel through which a gas directly flows to the throat 232 without the bent portion 235 may be provided instead of the supersonic nozzle 203.

Since the electron beam E that acts as a trigger for changing a prodrug into an active substance is generated, the embodiments described above can also be defined as the electron beam generation apparatus for a prodrug and the electron beam generation method for a prodrug. In this regard, the electron beam generation apparatus for a prodrug may further include at least any one of a patient table on which a patient is laid, a spin controller configured to control the spin of the generated electron beam E to be aligned in a specific direction, a magnetic field applying unit configured to apply an external magnetic field along the propagation direction to the generated electron beam E, an electric field applying unit configured to apply an external electric field such that polarities of the prodrugs are aligned, a beam monitor configured to measure an electron beam E transmitted through a prodrug, and a beam dump configured to absorb and stop the electron beam E transmitted through the prodrug.

In the embodiments described above, the prodrugs may include not only a general prodrug but also a multi-prodrug and a dual-prodrug. In addition, the electron beam E generated by the embodiments described above may be used not only as a trigger for changing a prodrug into an active substance but also for another drug delivery system. For example, the electron beam E generated according to the embodiments described above may be used to collapse a drug carrier and release a drug. That is, the embodiments described above can be defined as an electron beam generation apparatus for a drug carrier and an electron beam generation method for a drug carrier.

The radiation targets of the embodiments described above are not particularly limited. For example, the radiation target may be a medical agent that reacts to light (a photosensitizer and an optical immunotherapeutic agent). The electron beam generation apparatus according to an aspect of the present invention can be applied to various fields. Various materials and shapes can be applied to the configurations in the embodiments described above without being limited to the above-described materials and shapes. Some of the configurations in the embodiments described above can be omitted, as appropriate, without departing from the gist of one aspect of the present disclosure.

The embodiments described above may be used for treatment of a neurodegenerative disease such as Alzheimer's disease and brain diseases such as a brain tumor. In a case where the brain disease is targeted, an administered drug needs to transit a path from the bloodstream into the brain, but in this case, the drug has to pass through the blood-brain barrier separating the blood from the brain tissue. In general, it is known that a drug having high lipid solubility has high intracerebral transitivity. In the embodiments described above, when a prodrug having improved lipid solubility is produced by masking a substituent having low lipid solubility in the drug, and after the prodrug arrives in the brain, the prodrug is activated by radiating the electron beam E, it is expected that the intracerebral transitivity can be improved and the prodrug can act specifically on the brain.

To any one of the first embodiment, the second embodiment, the third embodiment, and the modification examples, at least some or all of the other characteristics of the embodiments and the modification examples may be applied. That is, the first embodiment may include, instead of or in addition to some of the configurations or the steps thereof, some or all of the configurations or the steps of at least any one of the second embodiment, the third embodiment, and the modification examples. The second embodiment may include, instead of or in addition to some of the configurations or the steps thereof, some or all of the configurations or the steps of at least any one of the first embodiment, the third embodiment, and the modification examples. The third embodiment may include, instead of or in addition to some of the configurations or the steps thereof, some or all of the configurations or the steps of at least any one of the first embodiment, the second embodiment, and the modification examples. The modification examples may include, instead of or in addition to some of the configurations or the steps thereof, some or all of the configurations or the steps of at least any one of the first embodiment, the second embodiment, and the third embodiment.

For example, the electron beam generation apparatus 201 may include the supersonic nozzle 3 or the supersonic nozzle 103, or the electron beam generation apparatus 1 may include the supersonic nozzle 203. The electron beam generation apparatus 201 may include the knife edge 4, or the electron beam generation apparatus 1 may include the knife edge 204. The electron beam generation apparatus 1 may include the back plate 206. The electron beam generation apparatus 1 may include at least one of the knife edge slide mechanism 242 and the insertion angle adjusting mechanism 244.

The embodiments described above have the following characteristics.

(1A) An electron beam generation device according to one aspect of the present invention is an electron beam generation apparatus configured to generate an electron beam by propagating pulsed laser light in a supersonic gas flow, the electron beam generation apparatus including a supersonic nozzle configured to generate the supersonic gas flow flowing along a first direction under a vacuum atmosphere; a knife edge configured to be inserted into the supersonic gas flow from one side in a second direction intersecting the first direction and form a shock wave in the supersonic gas flow, and a radiation unit configured to radiate the pulsed laser light into the supersonic gas flow and propagate the pulsed laser light to pass through the shock wave in the supersonic gas flow, in which the supersonic nozzle has a convergence portion having a downstream end forming a throat and an upstream end having a flow channel cross-sectional area larger than a cross-sectional area of the throat, and a flow straightening chamber configured to be smoothly connected to the upstream end of the convergence portion and extend by a predetermined length.

In the electron beam generation apparatus according to the one aspect of the present invention, the supersonic gas flow is formed under the vacuum atmosphere by the supersonic nozzle, the knife edge is inserted into the formed supersonic gas flow, and the shock wave is formed in the supersonic gas flow. When the pulsed laser light is radiated and propagated in the supersonic gas flow, the pulsed laser light passes through the shock wave, thereby causing the electron beam having directionality to the other side in the second direction to be generated. Here, as a result of close studies, the present inventors have found that the stability of the electron beam is affected by the stability of a gas density distribution of the supersonic gas flow (hereinafter, also simply referred to as a "gas density distribution"). In this respect, in the one aspect of the present invention, since the supersonic nozzle has the flow straightening chamber, for example, generation of a turbulent flow (uncertainty in turbulent motion) in the supersonic gas flow generated by the supersonic nozzle can be curbed, and the stability of the gas density distribution can be enhanced. This enables the stability of the electron beam to be enhanced.

(2A) In the electron beam generation apparatus according to (1A), the convergence portion and the flow straightening chamber may extend along the first direction, and the predetermined length may be 20 mm or longer. In this case, the flow straightening chamber of the supersonic nozzle enables, for example, the generation of a turbulent flow in the supersonic gas flow generated by the supersonic nozzle to be reliably curbed and enables the stability of the gas density distribution to be reliably enhanced.

(3A) In the electron beam generation apparatus of the present invention according to (1A) or (2A), the supersonic nozzle may include a flow straightening member configured to be provided inside the flow straightening chamber and have a plurality of fine holes formed along a flowing direction of the flow straightening chamber. In this case, a flow rectification of the flow straightening member enables, for example, the generation of a turbulent flow in the supersonic gas flow generated by the supersonic nozzle to be further curbed and enables the stability of the gas density distribution to be further enhanced.

(4A) In the electron beam generation apparatus according to (3A), the convergence portion and the flow straightening chamber may extend along the first direction, and the predetermined length may be 10 mm or longer. In this case, the flow straightening chamber of the supersonic nozzle enables, for example, the generation of a turbulent flow in the supersonic gas flow generated by the supersonic nozzle to be reliably curbed and enables the stability of the gas density distribution to be reliably enhanced.

(5A) In the electron beam generation apparatus according to (3A) or (4A), the flow straightening member may be disposed inside the flow straightening chamber at a distance of 5 mm or longer from an upstream end or a downstream end of the flow straightening chamber. In this case, the flow rectification of the flow straightening member can be reliably exhibited.

(6A) An electron beam generation method according to the present invention is an electron beam generation method for generating an electron beam by propagating pulsed laser light in a supersonic gas flow, the electron beam generation method including a first step of generating the supersonic gas flow flowing along a first direction under a vacuum atmosphere by a supersonic nozzle, a second step of inserting a knife edge into the supersonic gas flow from one side in a second direction intersecting the first direction and forming a shock wave in the supersonic gas flow, and a third step of radiating the pulsed laser light into the supersonic gas flow by a radiation unit, propagating the pulsed laser light to pass through the shock wave in the supersonic gas flow, and generating the electron beam, in which, in the second step, a plate member configured to be disposed by the other side of the supersonic nozzle in the second direction and project from the supersonic nozzle in the first direction beyond a condensing point of the pulsed laser light extends along a boundary plane of the supersonic gas flow, and in the third step, the generated electron beam passes through a through-hole formed in the plate member.

Also in this electron beam generation method, the plate member enables spreading of the supersonic gas flow ejected from the supersonic nozzle to the other side in the second direction to be curbed without interfering with the generated electron beam. This causes a strong shock wave to be stably formed in the supersonic gas flow, thereby enabling the stability of the gas density distribution to be enhanced and enabling the stability of the electron beam to be enhanced.

(7A) An electron beam generation method according to the present invention is an electron beam generation method for generating an electron beam by propagating pulsed laser light in a supersonic gas flow, the electron beam generation method including a first step of generating the supersonic gas flow flowing along a first direction under a vacuum atmosphere by a supersonic nozzle, a second step of inserting a knife edge into the supersonic gas flow from one side in a second direction intersecting the first direction and forming a shock wave in the supersonic gas flow, and a third step of radiating the pulsed laser light into the supersonic gas flow by a radiation unit, propagating the pulsed laser light to pass through the shock wave in the supersonic gas flow, and generating the electron beam, in which the first step includes a step of allowing a gas to flow from the outside to a throat that chokes a flow of the gas in the supersonic nozzle, and in the step of allowing the gas to flow to the throat, the flow of the gas in the supersonic nozzle is bent at least once toward a direction intersecting the first direction. In this electron beam generation method, the gas can be prevented from directly flowing from the outside of the supersonic nozzle to the throat, and the gas density distribution can be made uniform in the second direction.

REFERENCE SIGNS LIST

1, 201 electron beam generation apparatus
3, 103, 203 supersonic nozzle
4, 204 knife edge
5, 205 pulsed laser light source (radiation unit)
8 mesh member (flow straightening member)
31 throat
33 convergence portion
34 flow straightening chamber
206 back plate (plate member)
206*x* through-hole
232 throat
233 gas flow channel
235 bent portion
235A first bent portion
235B second bent portion
E electron beam
G supersonic gas flow
GB boundary plane
I shock wave
L pulsed laser light
LS condensing point

The invention claimed is:

1. An electron beam generation apparatus configured to generate an electron beam by propagating pulsed laser light in a supersonic gas flow, the electron beam generation apparatus comprising:
- a supersonic nozzle configured to generate the supersonic gas flow flowing along a first direction under a vacuum atmosphere;
- a knife edge configured to be inserted into the supersonic gas flow from one side in a second direction intersecting the first direction and form a shock wave in the supersonic gas flow; and
- a radiation unit configured to radiate the pulsed laser light into the supersonic gas flow and propagate the pulsed laser light to pass through the shock wave in the supersonic gas flow,
- wherein the supersonic nozzle includes
  - a convergence portion having a downstream end forming a throat and an upstream end having a flow channel cross-sectional area larger than a cross-sectional area of the throat, and
  - a flow straightening chamber configured to be smoothly connected to the upstream end of the convergence portion and extend by a predetermined length.

2. The electron beam generation apparatus according to claim 1,
- wherein the convergence portion and the flow straightening chamber extend along the first direction, and
- wherein the predetermined length is 20 mm or longer.

3. The electron beam generation apparatus according to claim 1, wherein the supersonic nozzle includes a flow straightening member configured to be provided inside the flow straightening chamber and have a plurality of fine holes formed along a flowing direction of the flow straightening chamber.

4. The electron beam generation apparatus according to claim 3,
- wherein the convergence portion and the flow straightening chamber extend along the first direction, and
- wherein the predetermined length is 10 mm or longer.

5. The electron beam generation apparatus according to claim 3, wherein the flow straightening member is disposed inside the flow straightening chamber at a distance of 5 mm or longer from an upstream end or a downstream end of the flow straightening chamber.

6. The electron beam generation apparatus according to claim 1, wherein at least a tip portion of the knife edge is inclined toward the supersonic nozzle with respect to a direction perpendicular to the first direction.

7. The electron beam generation apparatus according to claim 1, wherein the supersonic nozzle is configured to be dividable such that the flow straightening chamber is divided.

8. The electron beam generation apparatus according to claim 1, wherein the knife edge is configured to be able to adjust a length by which the knife edge is inserted into the supersonic gas flow.

9. The electron beam generation apparatus according to claim 1, wherein the knife edge is configured to be able to adjust an insertion angle being an angle between an extending direction of the knife edge and the second direction in a state where the knife edge is inserted into the supersonic gas flow.

10. The electron beam generation apparatus according to claim 1, wherein the knife edge causes a gas density distribution of the supersonic gas flow in the second direction to become a distribution that rises steeply, falls steeply, and then is maintained within a certain range from the one side toward the other side in the second direction.

11. The electron beam generation apparatus according to claim 10,
- wherein the pulsed laser light radiated from the radiation unit causes plasma wave crushing to occur, and the electron beam is generated by the plasma wave crushing in a region where the gas density distribution of the supersonic gas flow in the second direction falls steeply, and
- wherein the generated electron beam is accelerated in an acceleration region where the gas density distribution of the supersonic gas flow in the second direction is maintained within the certain range.

12. An electron beam generation method for generating an electron beam by propagating pulsed laser light in a supersonic gas flow, the electron beam generation method comprising:
- a first step of generating the supersonic gas flow flowing along a first direction under a vacuum atmosphere by a supersonic nozzle;
- a second step of inserting a knife edge into the supersonic gas flow from one side in a second direction intersecting the first direction and forming a shock wave in the supersonic gas flow; and
- a third step of radiating the pulsed laser light into the supersonic gas flow by a radiation unit, propagating the pulsed laser light to pass through the shock wave in the supersonic gas flow, and generating the electron beam,
- wherein the supersonic nozzle includes
  - a convergence portion having a downstream end forming a throat and an upstream end having a flow channel cross-sectional area larger than a cross-sectional area of the throat, and
  - a flow straightening chamber configured to be smoothly connected to the upstream end of the convergence portion and extend by a predetermined length, and wherein, in the first step, a gas is caused to flow by the predetermined length in the flow straightening chamber, and then the gas converges while being caused to flow in the convergence portion.

* * * * *